US011336203B2

(12) United States Patent
Sharifzadeh et al.

(10) Patent No.: US 11,336,203 B2
(45) Date of Patent: May 17, 2022

(54) MULTILEVEL ELECTRIC POWER CONVERTER

(71) Applicant: SOCOVAR S.E.C., Montréal (CA)

(72) Inventors: Mohammad Sharifzadeh, Montreal (CA); Kamal Al-Haddad, Montreal (CA)

(*) Notice: Subject to any disclaimer, the term of this patent is extended or adjusted under 35 U.S.C. 154(b) by 0 days.

(21) Appl. No.: 17/274,317

(22) PCT Filed: Sep. 9, 2019

(86) PCT No.: PCT/CA2019/051260
§ 371 (c)(1),
(2) Date: Mar. 8, 2021

(87) PCT Pub. No.: WO2020/047677
PCT Pub. Date: Mar. 12, 2020

(65) Prior Publication Data
US 2021/0344279 A1    Nov. 4, 2021

Related U.S. Application Data

(60) Provisional application No. 62/728,734, filed on Sep. 7, 2018.

(51) Int. Cl.
*H02M 7/483* (2007.01)
*H02M 7/487* (2007.01)
(Continued)

(52) U.S. Cl.
CPC ....... *H02M 7/4833* (2021.05); *H02M 1/0095* (2021.05); *H02M 7/487* (2013.01);
(Continued)

(58) Field of Classification Search
CPC ............. H02M 1/0095; H02M 7/4833; H02M 7/4837; H02M 7/487; H02M 7/5387; H02M 7/5388; H02M 7/5395
See application file for complete search history.

(56) References Cited

U.S. PATENT DOCUMENTS 4,347,558 A      8/1982    Kalinsky
7,639,515 B2 *  12/2009   Ponnaluri ........... H02M 7/4837
                                                                    363/17
(Continued)

FOREIGN PATENT DOCUMENTS

CN     103078545 A     2/2015
CN     105515428 A     4/2016
(Continued)

*Primary Examiner* — Jue Zhang
(74) *Attorney, Agent, or Firm* — Norton Rose Fulbright Canada LLP

(57) ABSTRACT

A multilevel power converter and method for transforming DC power from a DC source into AC power for an AC load are provided. The converter is composed of a half-bridge inverter, a switching cell, and a controller configured for controlling operation of the half-bridge inverter and the switching cell. The half-bridge inverter and the switching cell are connectable to the DC source and the AC load. The switching cell is composed of first and second pairs of switches forming first and second branches in parallel, first and second capacitors connected in series in a capacitor branch connected between the first and second branches, and a pair of back-to-back connected switches in a third branch, the third branch connected to the capacitor branch and connectable to the AC load.

20 Claims, 23 Drawing Sheets

(51) Int. Cl.
*H02M 7/5387* (2007.01)
*H02M 1/00* (2006.01)
*H02M 7/5395* (2006.01)
*H02M 7/5388* (2007.01)

(52) U.S. Cl.
CPC ........ *H02M 7/5387* (2013.01); *H02M 7/4837* (2021.05); *H02M 7/5388* (2013.01); *H02M 7/5395* (2013.01)

(56) References Cited

U.S. PATENT DOCUMENTS

| | | | |
|---|---|---|---|
| 8,598,741 B2 | 12/2013 | Kim et al. | |
| 9,331,599 B2* | 5/2016 | Al-Haddad | H02M 7/483 |
| 9,806,637 B2 | 10/2017 | Fu | |
| 9,837,930 B2 | 12/2017 | Hao et al. | |
| 9,876,430 B2 | 1/2018 | Glovinsky | |
| 2014/0092661 A1 | 4/2014 | Zhang et al. | |
| 2014/0146572 A1 | 5/2014 | Ye et al. | |
| 2014/0192572 A1 | 7/2014 | Tamai | |
| 2015/0263645 A1 | 9/2015 | Mihalache | |
| 2016/0126862 A1* | 5/2016 | Vahedi | H02M 7/537 363/131 |
| 2016/0352251 A1* | 12/2016 | Li | H02M 7/487 |
| 2017/0099013 A1 | 4/2017 | Martini et al. | |
| 2017/0194877 A1 | 7/2017 | Kadam et al. | |
| 2017/0288403 A1 | 10/2017 | Lung et al. | |
| 2018/0219492 A1 | 8/2018 | Shi et al. | |

FOREIGN PATENT DOCUMENTS

| | | | |
|---|---|---|---|
| CN | 103701346 A | 5/2016 | |
| CN | 205212724 U | 5/2016 | |
| CN | 106787814 A | 5/2017 | |
| CN | 105978024 A | 10/2018 | |
| CN | 109088558 A | 12/2018 | |
| CN | 109391167 A | 2/2019 | |
| CN | 106602913 A | 3/2019 | |
| CN | 109755960 A | 5/2019 | |
| CN | 108566108 A | 10/2019 | |
| CN | 108306537 A | 2/2020 | |
| CN | 107659193 A | 9/2020 | |
| EP | 2816718 | 12/2014 | |
| EP | 3197038 B1 | 12/2018 | |
| IN | 201711028998 A | 8/2017 | |
| IN | 201741041150 A | 11/2017 | |
| IN | 201611026219 A | 2/2018 | |
| IN | 201831003729 A | 8/2019 | |
| KR | 101484105 B | 1/2015 | |
| KR | 20160109129 A | 3/2017 | |
| KR | 101735749 B | 5/2017 | |
| MA | 40701 A1 | 1/2019 | |
| WO | 2017157271 A1 | 9/2017 | |
| WO | 2018153433 | 8/2018 | |

* cited by examiner

300

TABLE I
SWITCHING STATES OF NINE-LEVEL PEC INVERTER

| States | $S_1$ | $S_2$ | $S_3$ | $S_4$ | $S_5$ | $S_6$ | $S_7$ | $S_8$ | $V_{out}$ |
|---|---|---|---|---|---|---|---|---|---|
| 1 | 1 | 0 | 0 | 0 | 1 | 1 | 1 | 0 | +E |
| 2 | 1 | 0 | 0 | 0 | 1 | 0 | 1 | 1 | +3E/4 |
| 3 | 1 | 0 | 1 | 0 | 1 | 0 | 0 | 1 | +E/2 |
| 4 | 1 | 1 | 0 | 0 | 0 | 1 | 1 | 0 | +E/2 |
| 5 | 1 | 1 | 0 | 0 | 0 | 0 | 1 | 1 | +E/4 |
| 6 | 0 | 0 | 0 | 1 | 1 | 1 | 1 | 0 | 0 |
| 7 | 1 | 1 | 1 | 0 | 0 | 0 | 0 | 1 | 0 |
| 8 | 0 | 0 | 0 | 1 | 1 | 0 | 1 | 1 | -E/4 |
| 9 | 0 | 1 | 0 | 1 | 0 | 1 | 1 | 0 | -E/2 |
| 10 | 0 | 0 | 1 | 1 | 1 | 0 | 0 | 1 | -E/2 |
| 11 | 0 | 1 | 0 | 1 | 0 | 0 | 1 | 1 | -3E/4 |
| 12 | 0 | 1 | 1 | 1 | 0 | 0 | 0 | 1 | -E |

302

TABLE II
VOLTAGE STATE OF SPLIT CAPACITORS OF
NINE-LEVEL PEC INVERTER (↑: CHARGING, ↓: DISCHARGING, −: NOTHING)

| State | $I_{out}$ | $C_1$ | $C_2$ | $V_{out}$ | $I_{out}$ | $C_1$ | $C_2$ | $V_{out}$ |
|---|---|---|---|---|---|---|---|---|
| 1 | > 0 | − | − | +E | < 0 | − | − | +E |
| 2 | > 0 | ↓ | − | +3E/4 | < 0 | ↑ | − | +3E/4 |
| 3 | > 0 | ↓ | ↓ | +E/2 | < 0 | ↑ | ↑ | +E/2 |
| 4 | > 0 | ↑ | ↑ | +E/2 | < 0 | ↓ | ↓ | +E/2 |
| 5 | > 0 | − | ↑ | +E/4 | < 0 | − | ↓ | +E/4 |
| 6 | > 0 | − | − | 0 | < 0 | − | − | 0 |
| 7 | > 0 | − | − | 0 | < 0 | − | − | 0 |
| 8 | > 0 | ↓ | − | -E/4 | < 0 | ↑ | − | -E/4 |
| 9 | > 0 | ↑ | ↑ | -E/2 | < 0 | ↓ | ↓ | -E/2 |
| 10 | > 0 | ↓ | ↓ | -E/2 | < 0 | ↑ | ↑ | -E/2 |
| 11 | > 0 | − | ↑ | -3E/4 | < 0 | − | ↓ | -3E/4 |
| 12 | > 0 | − | − | -E | < 0 | − | − | -E |

Table III
COMPONENT COMPARISON AMONG CONVENTIONAL AND PEC TOPOLOGIES

| Inverter Type | DC Sources | Auxiliary Capacitor | Power Switch | Diode Clamped |
|---|---|---|---|---|
| CHB | (m-1)/2 | 0 | 2(m-1) | 0 |
| DCI | 1 | m-1 | 2(m-1) | 2(m-2) |
| FCI | 1 | m | 2(m-1) | 0 |
| PEC | 1 | (m-1)/4 | (m+7)/2 | 0 |

602

Table IV
COMPONENT COMPARISON AMONG RECENT INTRODUCED NINE-LEVEL AND PEC TOPOLOGIES

| Inverter Type | DC Sources | Auxiliary Capacitor | Power Switch | Diode Clamped |
|---|---|---|---|---|
| DSCC-HBC [30] | 1 | 2 | 9 | 2 |
| Hybrid H-Bridge [31] | 1 | 4 | 12 | 0 |
| DHANPC [32] | 1 | 3 | 12 | 0 |
| Nine-level PEC | 1 | 2 | 8 | 0 |

Figure 6

Table V
UTILIZED PARAMETERS VALUED IN SIMULATION TEST OF PEC INVERTER

| | |
|---|---|
| Grid voltage ($V_s$) | 110 Vrms |
| Fundamental frequency | 60 Hz |
| Switching frequency (SPWM) | 4000 Hz |
| Grid side inductor ($L_s$) | 2.5 mH |
| DC voltage ($V_{dc}$) | 200 V |
| Auxiliary capacitor capacitance ($C_1$ & $C_2$) | 3500 µF |
| Linear load; resistor and inductor (R & L) | 40 Ω & 20 mH |
| Nonlinear load; resistor and inductor of dc side (R & L) | 80 Ω & 40 mH |

MULTILEVEL ELECTRIC POWER CONVERTER

CROSS-REFERENCE TO RELATED APPLICATIONS

The present application is a national phase entry of, and claims priority from, International Application PCT/CA2019/051260, filed 2019 Sep. 9, which claims priority from U.S. Provisional Application 62/728,734, filed 2018 Sep. 7, the entire contents of which are incorporated by reference herein.

TECHNICAL FIELD

The present disclosure relates generally to the field of power electronic converters, and more particularly to multilevel voltage source converters.

BACKGROUND

Voltage Source Inverters (VSIs) have become a dominant power electronics converter in various industrial applications such as those related to renewable energy, Uninterruptible Power Supply (UPS), electrical motor drives, Active Power Filter (APF), and High-Voltage Direct-Current (HVDC). The conventional two-level VSI design has a simple structure and operates via uncomplicated control strategies. However, this conventional design has limited applicability to high voltage and power applications. Moreover, the conventional two-level VSI design can fail to produce a high quality waveform with acceptable harmonic content. In order to overcome these drawbacks, certain designs of Multilevel Voltage Source Inverters (MVSIs) were developed in the early 1980s by introducing three-level neutral-point-clamped (NPC) inverters. MVSIs use multiple semiconductor devices capable of dividing the DC voltage coming from DC sources or auxiliary capacitors, enabling the production of multiple voltage levels at the output terminal. Hence, MVSIs are generally used in higher voltage and power applications. Moreover, since a greater number of voltage levels are produced at the output terminal, a sinusoidal waveform with greater accuracy and with lower harmonic distortion can be produced.

The first generation of MVSIs are classified into three main inverter groups consisting of Diode Clamped Inverter (DCI), Flying Capacitors Inverter (FCI) and Cascaded H-Bridge (CHB) Inverters. Following the first generation of MVSIs, more efficient MVSI topologies were developed, which used fewer semiconductor components, replaced DC sources by DC capacitors, and produced more output voltage levels. Hybrid structures of MVSIs were also developed to increase number of voltage levels without reducing the number of components, such as with cascaded DCI or FCI topologies. Other MVSIs topologies producing a greater number of voltage levels have been developed, which can produce sinusoidal waveforms with improved accuracy. However, some MVSIs require many additional components and present complex structures. The trade-off of increased output voltage levels for additional components and increased topology complexity is commonplace.

Presented in FIG. 1A is a Packed U-Cell (PUC) MVSI topology 100, as described in U.S. Pat. No. 9,923,484. The PUC 100 is a single-DC source inverter based on a modification of the FCI. It was initially designed to produce seven voltage levels by adjusting the capacitor voltage to a desired level using a complex controller. To avoid using a complex external controller, a five voltage level PUC was proposed using a self-balancing capacitor 102 where the capacitor voltage is self-balanced using a redundancy of switching states, according to a voltage measurement provided by sensor 104. One disadvantage of the PUC topology 100 is that the balancing of the capacitor voltage is complicated when a greater number of voltage levels are desired. Indeed, in order to balance the capacitor voltage a complex controller is required when producing more than five voltage levels with the PUC inverter 100. As presented in FIG. 1B, an alternate topology for a PUC inverter 110 is shown. The inverter 110 is a nine level inverter having two capacitors (112 and 114) that are vertically installed. As can be noticed, separate sensors (116 and 118) are required for each capacitor to measure their voltages and to provide nine voltage levels. Other single-DC source inverters have been proposed; however, existing inverters necessitate additional switches and complex voltage balancing of auxiliary capacitors. Improvements are therefore needed.

SUMMARY

The present disclosure provides, in at least some broad aspects, a single-DC source multilevel inverter having at least one E-Cell. Each of the at least one E-Cell has split capacitors and bidirectional switches. The voltages of the split capacitors are actively balanced through redundancy of switching states. Each of the at least one E-Cells is extended in parallel with the single-DC source and only one sensor is required to be installed across an auxiliary DC-link in order to measure the voltages of the capacitors.

In some embodiments, the multilevel inverter can continue its operation even if a fault occurs on the bidirectional switches.

In accordance with at least one other embodiment, there is provided a multilevel power converter for transforming direct current (DC) power from a DC source to alternating current (AC) power for an AC load. The multilevel power converter comprises: a half-bridge inverter connectable to first and second ports of the DC source and to a first port of the AC load; a switching cell connected to the half-bridge inverter and connectable to the DC source, in parallel with the half-bridge inverter, and to a second port of the AC load; and a controller coupled to the half-bridge inverter and to the switching cell and configured for controlling operation of the half-bridge inverter and the switching cell to convert the DC power from the DC source to the AC power for the AC load. The switching cell comprises: a first pair of switches forming a first branch connectable between the first port of the DC source and the second port of the AC load; a second pair of switches forming a second branch connectable between the second port of the DC source and the second port of the AC load, in parallel with the first branch; first and second capacitors connected in series in a capacitor branch, the capacitor branch connected between the first and second branches at first and second points located between the switches of the first and second pairs of switches, respectively; and a pair of back-to-back connected switches in a third branch, the third branch connected to the capacitor branch at a third point located between the first and second capacitors and connectable to the second port of the AC load.

In at least some embodiments, the switching cell further comprises: at least one additional capacitor connected in the capacitor branch; and at least one additional branch connected to the capacitor branch at a respective additional point located between the at least one additional capacitor and an adjacent capacitor and connectable to the second port of the AC load, the at least one additional branches comprising at least one additional pair of back-to-back connected switches.

In at least some embodiments, the controller is configured to convert the DC power to the AC power by producing m voltage levels, where m=number of capacitors×4+1, wherein the number of capacitors includes the first and second capacitors and the at least one additional capacitor.

In at least some embodiments, the switching cell is a first switching cell, further comprising at least one additional switching cell connected in parallel to the half-bridge inverter and to the first switching cell, the at least one additional switching cell being connectable to a second port of the AC load.

In at least some embodiments, the multilevel power converter further comprises at least one voltage sensor coupled to the at least one additional switching cell for measuring voltages of capacitors of the at least one additional switching cell.

In at least some embodiments, the controller is configured to convert the DC power to the AC power by producing at least seventeen voltage levels.

In at least some embodiments, controlling operation of the switching cell comprises regulating voltages of the first and second capacitors.

In at least some embodiments, regulating the voltages of the first and second capacitors comprises actively balancing the voltages of the first and second capacitors.

In at least some embodiments, actively balancing the voltages of the first and second capacitors comprises balancing the voltages of the first and second capacitors to equal values.

In at least some embodiments, the equal values are of one-quarter of a voltage amplitude of the DC source.

In at least some embodiments, the multilevel power converter further comprises a voltage sensor coupled to the switching cell for measuring voltages of the first and second capacitors.

In at least some embodiments, the controller is configured to convert the DC power to the AC power by producing at least nine voltage levels.

In at least some embodiments, the multilevel power converter further comprises an external controller for adjusting the voltage of each capacitors to ⅕ of the DC power in order to produce at least eleven voltage levels.

In at least some embodiments, a switching frequency of switches composing the half-bridge inverter is lower than a switching frequency of the first and second pairs of switches of the switching cell.

In at least some embodiments, a rated voltage value of the first and second pairs of switches of the switching cell is lower than a rated voltage value of switches composing the half-bridge inverter.

In accordance with at least one further embodiment, there is provided a method for transforming direct current (DC) power from a DC source to alternating current (AC) power for an AC load. The DC power is obtained at a multilevel power converter connected to the DC source and to the AC load, the multilevel power converter comprising a half-bridge inverter, connected to first and second ports of the DC source and to a first port of the AC load, and a switching cell, connected to the first and second ports of the DC source in parallel with the half-bridge inverter and to a second port of the AC load, wherein the switching cell comprises first and second capacitors connected in series and split by a pair of back-to-back connected switches. Measurement values are obtained from a sensor indicative of voltages of the first and second capacitors. Operation of the half-bridge inverter and the switching cell is controlled to convert the DC power from the DC source to the AC power for the AC load based on the voltages of the first and second capacitors by activating at least one of the back-to-back connected switches. The AC power is output from the multilevel power converter to the AC load via the first and second ports of the AC load.

In at least some embodiments, obtaining measurement values from the sensor comprises obtaining measurement values indicative of voltages of the first and second capacitors, and of at least one third capacitor of the switching cell, and wherein the operation of the switching cell is further controlled based on the voltage of the at least one third capacitor.

In at least some embodiments, the sensor is a first sensor, and the method further comprising obtaining measurement values from a second sensor indicative of voltages of at least third and fourth capacitors of at least one additional switching cell connected in parallel to the half-bridge inverter and to the first switching cell In at least some embodiments, controlling operation of the switching cell comprises regulating voltages of the first and second capacitors.

In at least some embodiments, regulating the voltages of the first and second capacitors comprises actively balancing the voltages of the first and second capacitors to equal values.

Features of the systems, devices, and methods described herein may be used in various combinations, in accordance with the embodiments described herein.

BRIEF DESCRIPTION OF THE DRAWINGS

Further features and advantages of the present invention will become apparent from the following detailed description, taken in combination with the appended drawings, in which:

FIG. 3 presents a switching state table and a capacitor voltage state table for the MVSI topology of FIG. 2, according to at least one embodiment;

FIG. 6 presents tables showing a comparison between various known MVSI topologies and the MVSI topology of FIG. 2, according to at least one embodiment;

It will be noted that throughout the appended drawings, like features are identified by like reference numerals.

DETAILED DESCRIPTION

Figure 2:
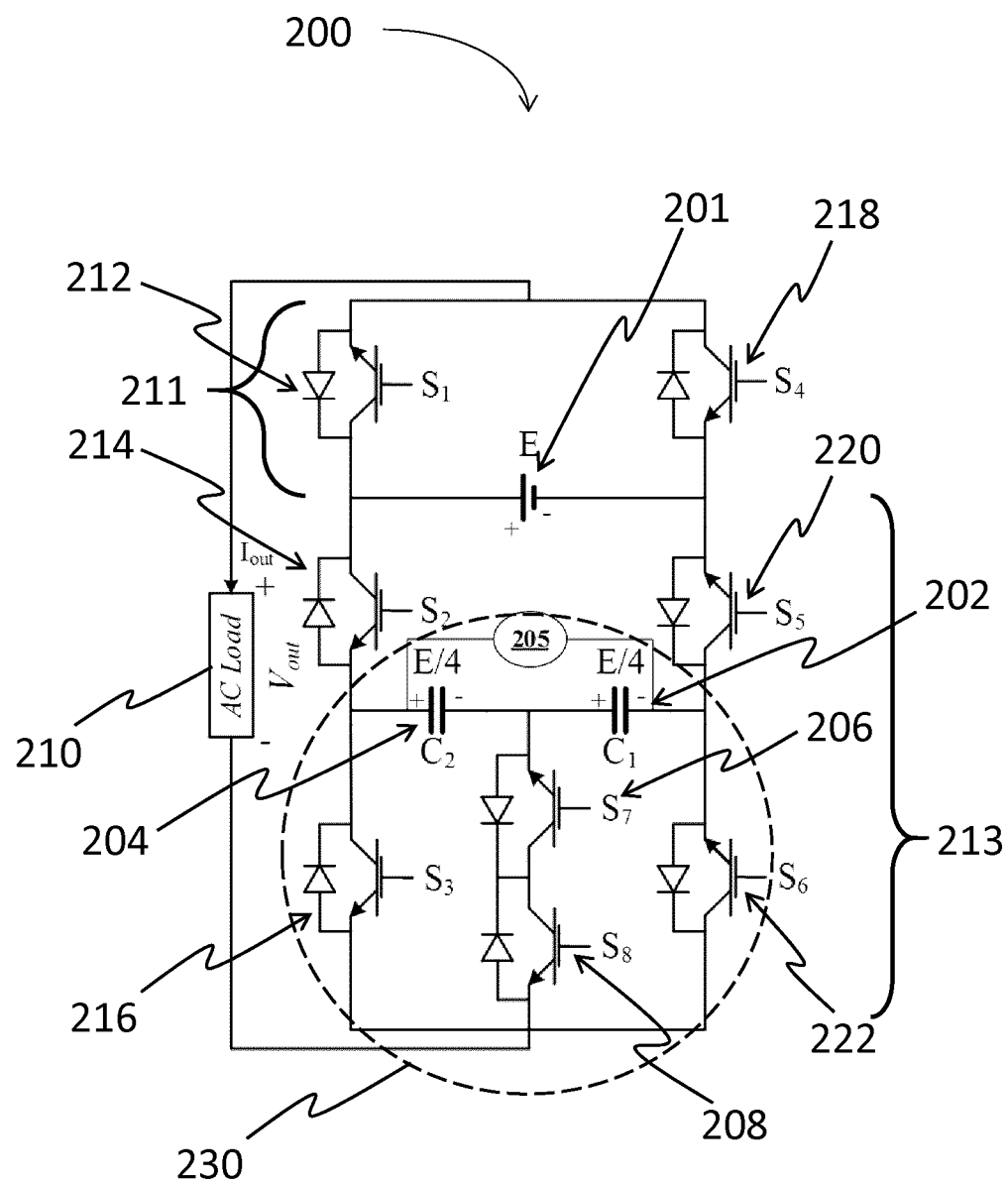
FIG. 2 presents a MVSI topology, according to at least one embodiment.

According to at least one embodiment of the present disclosure, there is presented in FIG. 2 a single-DC source Multilevel Voltage Source Inverter (MVSI) topology, indicated generally at 200, for providing alternating current (AC) power to an AC load 210. The topology is referred herein as a Packed E-Cell (PEC) inverter 200. Although the discussion in the present disclosure focuses primarily on the use of the PEC inverter 200 as a current inverter, it should be understood that the topology illustrated in FIG. 2 can also be used as a current rectifier, or as other types of current converters, depending on the particulars of the implementation.

The PEC inverter 200 has a single DC source 201 and is generally composed of two main portions: a half-bridge inverter 211 and a switching cell 213, which includes two DC capacitors 202 and 204. The embodiment of the PEC inverter 200 is configured to produce at least nine voltage levels by actively balancing the DC capacitors 202 and 204 using a redundancy of switching states.

The half-bridge inverter 211 of the PEC inverter 200 is configured for being connected to the DC source 201 at first and second ports thereof. In this case, the DC source 201 has a positive terminal and a negative terminal, which constitute the first and second ports of the DC source 201. The half-bridge inverter 211 is composed of two power switches 212, 218 which are connected in series. The half-bridge inverter 211 is connectable to a first port of the AC load 210, for instance at a point between the power switches 212, 218. In some embodiments, the half-bridge inverter 211 is connectable to the positive terminal of the AC load 210, though other embodiments are also considered.

The switching cell 213 is configured for being connected to the DC source 201 at the first and second ports in parallel with the half-bridge inverter 211. The switching cell 213 includes two branches which each connect to a respective one of the first and second ports of the DC source 201 and connect to one another opposite the DC source 201. The first branch is formed of switches 214 and 216, and the second branch is formed of switches 220 and 222. The capacitors 202 and 204 form a capacitor branch (also referred to herein as an "auxiliary DC link") which is connected between the first and second branches, connecting thereto at points located between the switches 214 and 216 and between the switches 220 and 222.

The switching cell 213 also has a pair of bidirectional switches 206, 208, which are connected in a third branch. In some embodiments, the bidirectional switches 206 and 208 are back-to-back connected switches, which can be connected in a common-source configuration, in a common-drain configuration, or in any other suitable fashion. For example, the switches 206, 208, can be connected so that the source of switch 206 and the source of switch 208 are connected. Other embodiments are also considered. The third branch that is composed of the bidirectional switches 206, 208 is connected between the capacitor branch and the first and second branches to divide the capacitors 202, 204 of the auxiliary DC link. As a result, the capacitors 202 and 204 are split and can allow the PEC inverter 200 to provide a broader range of DC voltages, leading to more voltage levels at AC load 210. Together, the bidirectional switches 206 and 208, the switches 216 and 222 that are connected in parallel with the bidirectional switches 206 and 208, and the capacitors 202, 204 of the auxiliary DC link form a so-called "E-Cell" 230 of the PEC 200.

Moreover, the bidirectional switches 206 and 208 can provide redundancy for the switching states of the PEC 200 and provide adequate charging and discharging states for the capacitors 202, 204. Therefore, the voltage of the capacitors 202 and 204 can be actively regulated to a desired voltage level. Since the capacitors 202 and 204 are split by the bidirectional switches 206 and 208 and are perpendicularly positioned with respect to the bidirectional switches 206 and 208 and since the capacitors (202 and 204) are parallel with the DC source, a single voltage sensor 205 can be used to measure the voltage across the capacitor branch; that is to say, across both capacitors 202, 204.

In some embodiments, switches 212, 218, which compose the half-bridge inverter 211, have a switching frequency less than a switching frequency of switches 206, 208, 214, 216, 220, and 222 of the switching cell 213. In some embodiments, a rated voltage value for switches 214, 216, 220, and 222 of the switching cell 213 is lower than a rated voltage value for switches 212, 218, which compose the half-bridge inverter 211. Other embodiments are also considered.

According to at least some embodiments of the PEC inverter 200, the PEC inverter 200 can generate nine voltage levels by balancing the two capacitors 202 and 204 to a voltage value equivalent to ¼ of that of the DC source. Also, in case a fault occurs in one of the bidirectional switches 206 and 208, the PEC can continue its operation but as a five-level voltage inverter while maintaining a self-balanced DC-link. This fault-tolerant feature of the PEC inverter 200 provides reliability and flexibility, since both nine- and five-level inverters can be provided, while the auxiliary DC link is actively balanced. At least some embodiments of the PEC inverter 200 have been tested under standalone and grid-tied modes of operations to validate various performance characteristics and response to different load conditions. A controller coupled to the half-bridge inverter 211 and the switching cell 213 can be used to control operation of the PEC 200, including based on the voltages of the capacitors 202, 204.

According to at least some embodiment of the PEC inverter 200, the PEC inverter 200 can generate eleven voltage levels by adjusting with an external controller each capacitor of the auxiliary DC link to ⅕ of the DC source. In the case a fault occurs in one of the bidirectional switches 206 and 208, the PEC inverter 200 can continue its operation but as a seven-level voltage inverter while the auxiliary DC link is adjusted to ⅓ of the DC source by an external controller.

According to at least one embodiment, as presented by the PEC inverter 200 of FIG. 2, only one sensor 205 is required to regulate the capacitors 202 and 204 using the redundancy of switching states. The capacitors are split by the bidirectional switches 206 and 208. Instead of vertically extending the capacitors, as shown in the prior art of FIG. 1B, where a corresponding sensor (116 and 118) is required for each capacitor (112 and 114), the capacitors 202 and 204 are horizontally developed in the PEC inverter 200. Consequently only one sensor 205 is needed to control the capacitor voltages. As a result, a multilevel voltage waveform is produced at the output of the PEC inverter 201 for the AC load 210 by actively balancing the voltages of the capacitors 202 and 204.

According to at least one embodiment, and with additional reference to FIG. 2, the PEC inverter 200 has the one DC source 201 as an input voltage and the two capacitors 202 and 204 divided by bidirectional switches 206 and 208. In addition, the PEC inverter has the six additional power switches 212, 214, 216, 218, 220 and 222. As shown in FIG. 2, the bidirectional switches 206 and 208 are placed between the capacitors 202 and 204 to split the voltages applied to the capacitors, which can result in more voltage levels being produced at the AC load 210. In fact, with the right selection of switching states for PEC inverter 200, each of the capacitor voltages can be balanced to a quarter of input voltage provided by the DC source 201. For instance, for a given voltage amplitude E produced by the DC source 201, the auxiliary capacitors 202, 204 can be regulated to a voltage amplitude of E/4, and the PEC inverter 200 is thereby capable of producing nine voltage levels at the output AC terminal for the AC load 210.

In at least some embodiments, the PEC inverter 200 is controlled to produce nine voltage levels. With reference to FIG. 3, a switching state table 300 to produce nine voltage levels with the PEC 200 is provided. The PEC inverter 200 can be controlled according to the 12 switching states listed in table 300 in any suitable sequence. According to table 300, switch pairs 212 and 218 and switch pairs 214 and 220, as well as E-form switch pairs 216 and 206 and 222 and 208 are complementarily operated in order to prevent a short circuit of the DC source 201 or of the capacitors 202 and 204. The charging and discharging of the capacitors 202 and 204 depends on the current direction that passes through them. If the inverter current flows into one of the capacitors 202 and 204 from a positive side, it will be charged. In order to discharge the capacitors 202 and 204, the current must flow out from the positive side of the capacitors 202 and 204. Also, the voltage of the capacitors 202, 204 is not influenced if the current does not flow through it. Table 302 illustrates the voltage state of capacitors 202, 204 for each switching state of table 300, according to the current direction.

According to table 302, and for a given voltage amplitude E produced by the DC source 201, both capacitors 202 and 204 are simultaneously charged or discharged in order to produce voltage levels +E/2 and −E/2 at the output for the AC load 210. To produce voltage levels ±3E/4 and ±E/4 at the output for the AC load 210, only one of the two capacitors 202 and 204 is in charging or discharging state. To produce a 0 or a ±E voltage level at the output for the AC load 210, the capacitors are inactive.

The topology of the PEC inverter 200 provides various charging and discharging states for the capacitors 202 and 204, as detailed in split capacitor voltage state table 302. In some embodiments, the PEC inverter 200 can be operated as an active voltage balancing inverter. According to the split capacitor voltage state table 302, both capacitors 202 and 204 are equally charged and discharged during one complete cycle when the voltages of the capacitors 202 and 204 are controlled in levels ±E/2 using the redundancy of switching states. The input DC voltage from the DC source 201 can be equally shared between capacitors 202 and 204 so that each capacitor voltage can be balanced to E/4. In this fashion, the redundancies in switching states 3 and 4 for voltage level +E/2 and switching states 9 and 10 for voltage level −E/2 are produced by fluctuating the capacitor voltage between a charging and a discharging state.

For instance, at State 3, in order to produce an output voltage level of +E/2 both capacitors 202, 204 are charging and at State 4, in order to produce a same output voltage level of +E/2 both capacitors 202, 204 are discharging. In fact, each output voltage level +E/2 and −E/2 has one state in which both capacitors 202 are charging, and one state in which both capacitors 202, 204 are discharging. Thus, the PEC inverter 200 can provide multiple states for both capacitors at either +E/2 or −E/2 output voltage levels. Moreover, since the output voltage levels +E/2 or −E/2 are the summation of both capacitors voltages connected in series, it is sufficient to only control the voltage across the capacitor branch as depicted in FIG. 2 in order to regulate the voltages of the capacitors. Put differently, it may be unnecessary to measure the voltage of the capacitors 202, 204 independently. Hence, only one sensor is needed across the capacitors 202, 204 to measure the voltage of the capacitor branch.

Figure 4:
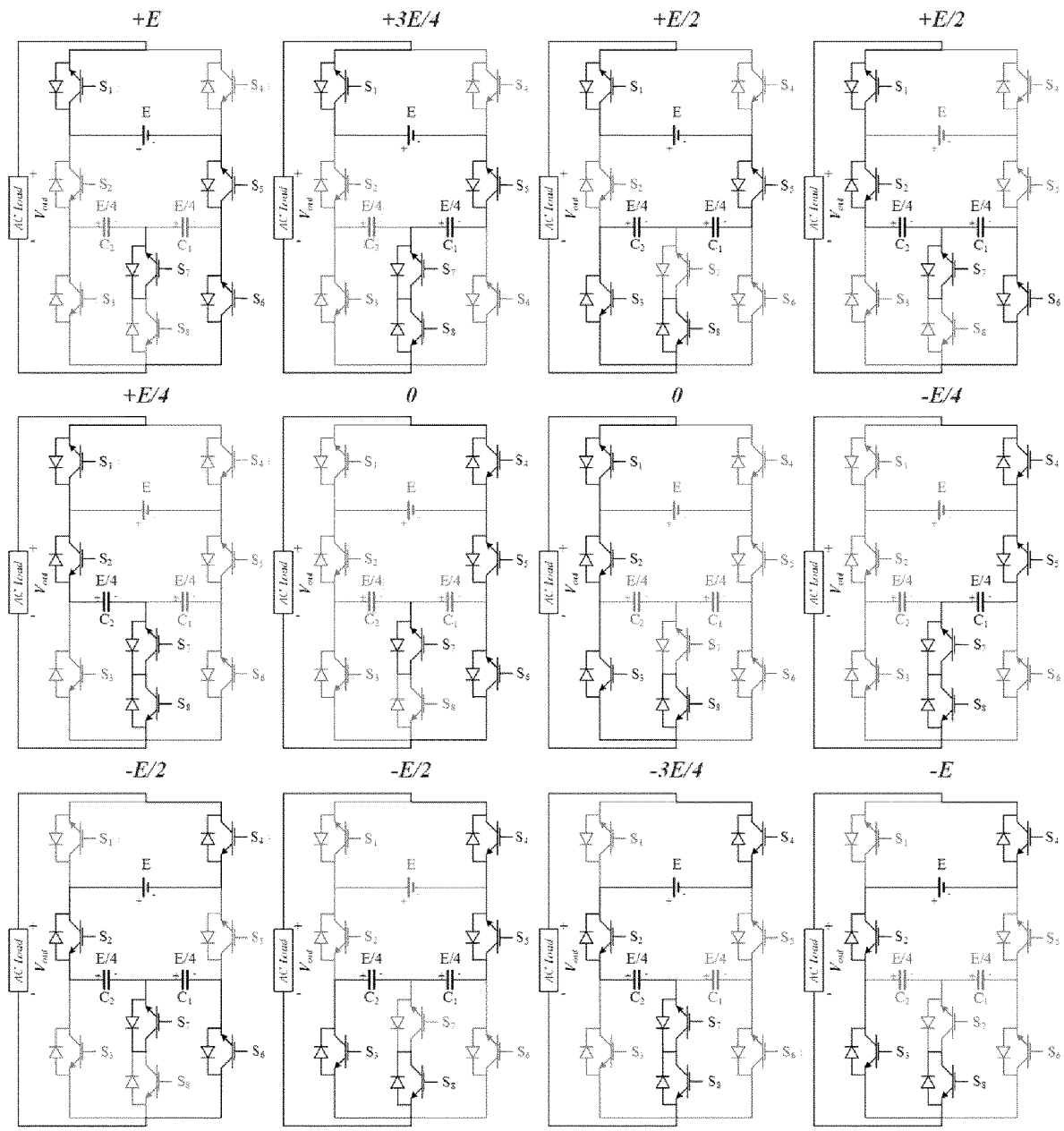
FIG. 4 presents various switching states and capacitor voltage states for the MVSI topology of FIG. 2 as defined in the tables of FIG. 3, according to at least one embodiment.

With reference to FIG. 4, illustrations of the PEC inverter 200 in different states for producing the nine voltage levels are illustrated. Portions of the PEC inverter 200 which are not used to produce a particular state are faded, whereas portions of the PEC inverter 200 which are used to produce a particular state are not faded. Put differently, the different faded and unfaded portions of the PEC inverter 200 indicate the various conducting paths corresponding to the switching states of table 300, in accordance with at least one embodiment.

Since both capacitors 202 and 204 are located in a same row, only one sensor is required to be installed across the capacitor branch to regulate capacitors voltages to a desired DC voltage level using switching states of table 300. Similar techniques can be applied to extend the PEC inverter 200 generates additional voltage levels, such as thirteen, seventeen, twenty-one, etc.

As shown in the PEC inverter 200 states of FIG. 4, both capacitors 202, 204 have a same state when producing a voltage of either +E/2 or −E/2 at the output for the AC load 210. However, only one split capacitor is charged or discharged when producing voltages of +E/4 or −E/4 and of +3E/4 or −3E/4 at the output for the AC load 210. Since only one capacitor is charged or discharged when producing voltages of +E/4, −E/4, +3E/4, or −3E/4 at the output for the AC load 210, the capacitors voltages need to be regulated in levels of ±E/2. In other words, the half levels (±E/2) adjust the amount of charging and discharging time to keep the capacitors voltages balanced at desired DC levels during one complete cycle. Considering capacitor 202 is charging to obtain a voltage of +3E/4 at the output for the AC load 210 and discharging to obtain a voltage of −E/4 at the output for the AC load 210, by controlling the voltages of capacitors 202, 204 in levels of ±E/2 using redundancy of switching states, the charging and discharging duration of capacitor 202 is equal in order to obtain a voltage of +3E/4 and −E/4 respectively at the output for the AC load 210. Similar conclusions can be drawn for capacitor 204 when it is charging in order to obtain a voltage of −3E/4 and discharging in order to obtain a voltage of +E/4 at the output for the AC load 210.

Figure 5A:
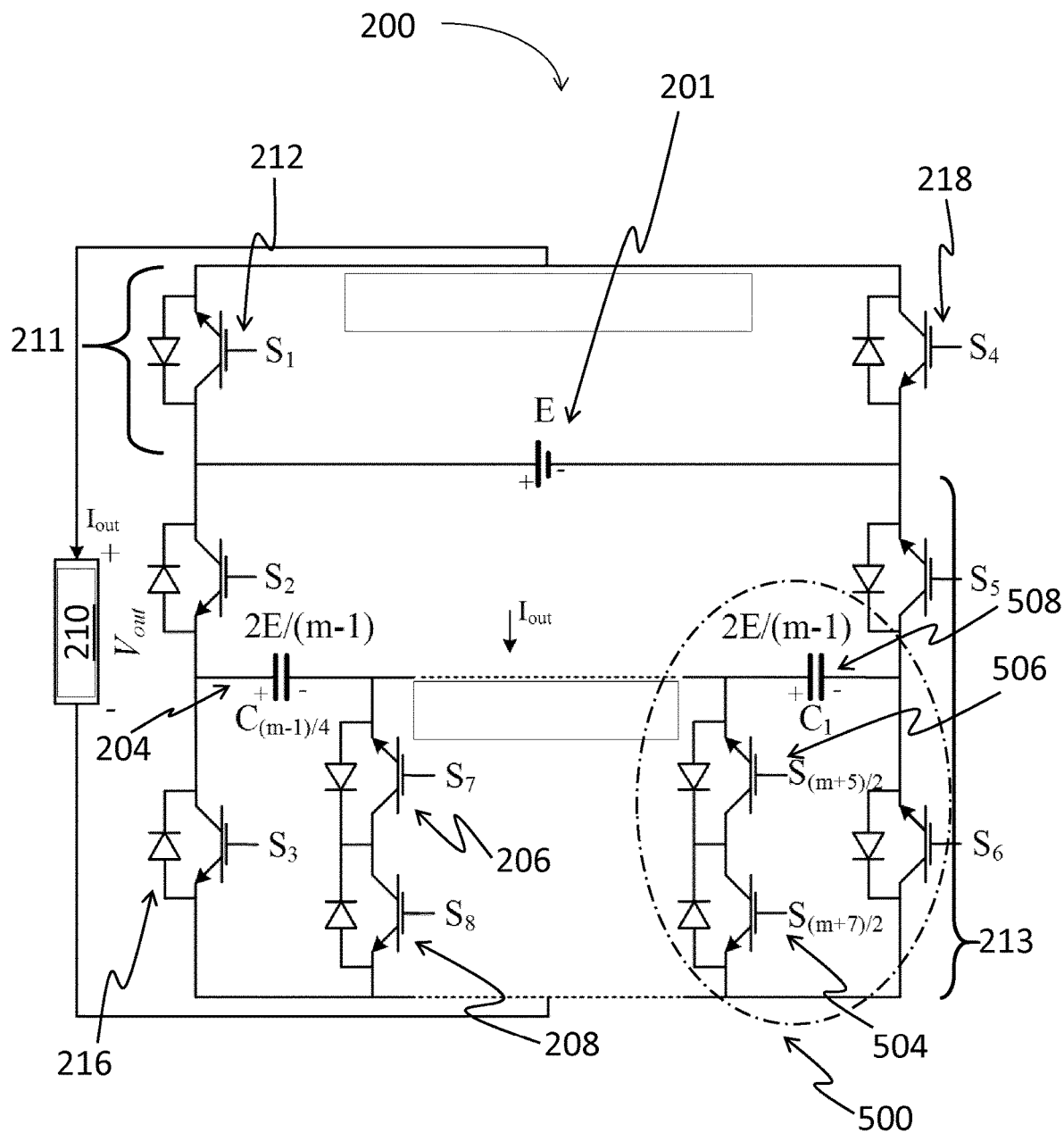
FIG. 5A presents a horizontally-extended MVSI topology having a variable number of switching cells, according to at least one embodiment.
Figure 5B:
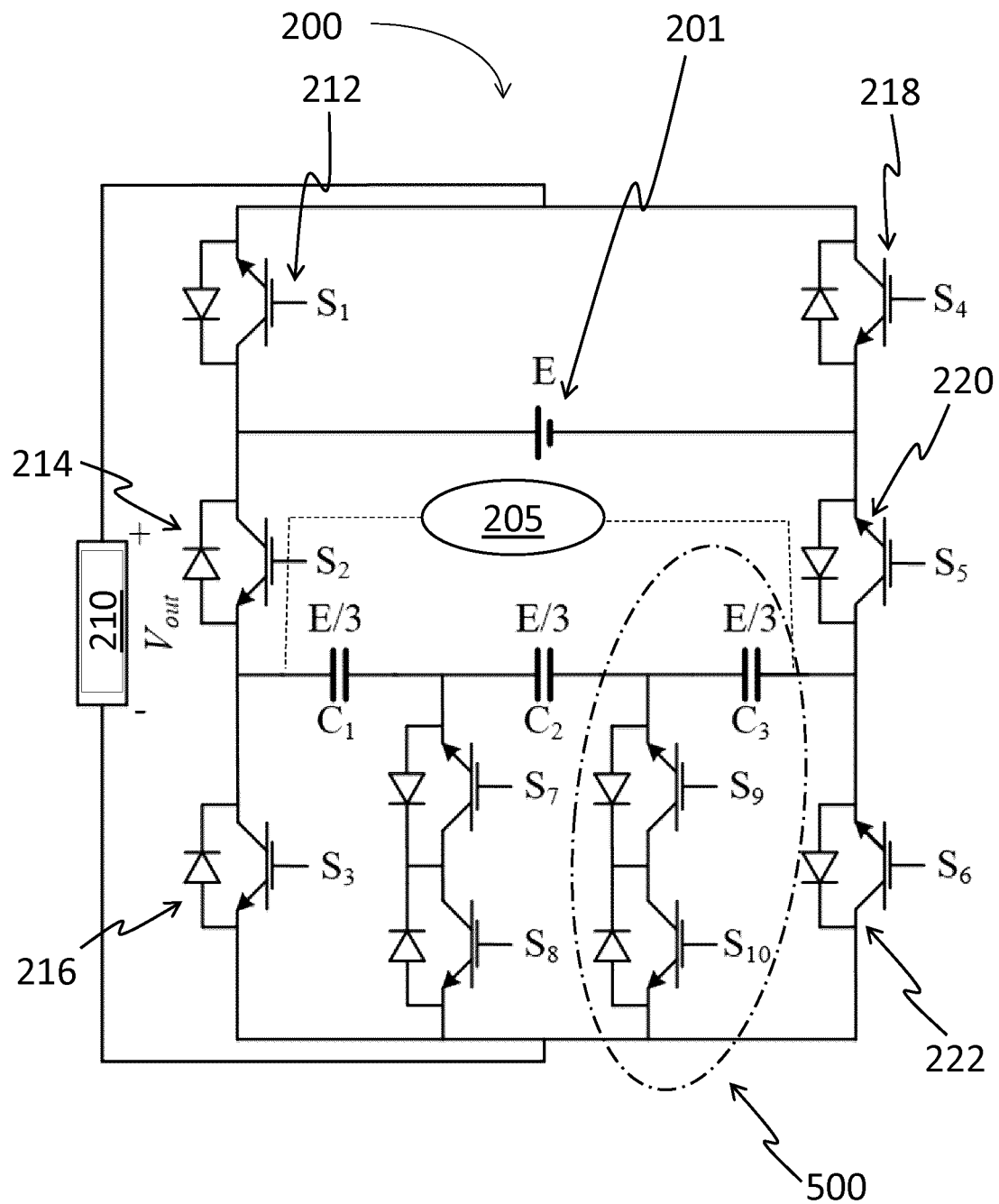
FIG. 5B presents a horizontally-extended MVSI topology having two switching cells, according to at least one embodiment.

With reference to FIGS. 5A and 5B, in at least some embodiments, the PEC inverter 200 is extendable by adding one or more partial E-Cells 500 to the switching cell 213. Each partial E-Cell 500 has an additional capacitor 508 and bidirectional switches 504 and 506 formed in an additional separate branch between the capacitor branch and the first and second branches. With each additional partial E-Cell 500 added to the switching cell 213, the number of voltage levels that can be produced increases. The number of voltage levels that can be produced is a level m=(number of capacitors×4+1). The partial E-Cells 500 are arranged in a horizontal manner—that is to say, so that additional bidirectional switching branches are parallel to the third branch which contains bidirectional switches 206, 208. Irrespective of the number of partial E-Cells 500 added to the PEC inverter 200, only one sensor 205 is required to balance the voltage of the capacitors which form the PEC inverter 200. The voltage balancing is achieved using the switching states redundancy when all capacitors in the capacitor branch are charging or discharging simultaneously. The switches 212 and 218 of the half-bridge inverter 211 are connected to the DC source 201 and operate at a low switching frequency since switch 212 is activated (i.e., in an "ON" state) only when in a positive cycle, and since switch 218 is activated only when in a negative cycle, according to the PEC switching states of table 300.

When in a nine level configuration, as in FIG. 2, the voltage across the capacitor branch is divided in two, namely across the bidirectional switches 206, 208. When in a horizontally-extended, m-level configuration, as in FIG. 5A, the voltage across the capacitor branch is divided in (m−1)/4 portions, which are spread across the plurality of bidirectional switches in the switching cell 213.

In some embodiments, similar switches are selected for the lower part of PEC inverter 200 (i.e. for each partial E-Cell 500 and/or for the switching cell 213 generally). In some embodiments, the switches for the partial E-Cells 500, and/or for the switching cell 213 generally, are selected to tolerate lower voltage ratios compared to the switches in the half-bridge inverter 211. Although the foregoing discussion focuses on the nine-level structure (i.e., the PEC inverter 200), it should be understood that other configurations of a multilevel single-DC source PEC inverter, for instance as described in FIGS. 5A and 5B, are also considered.

Figure 5C:
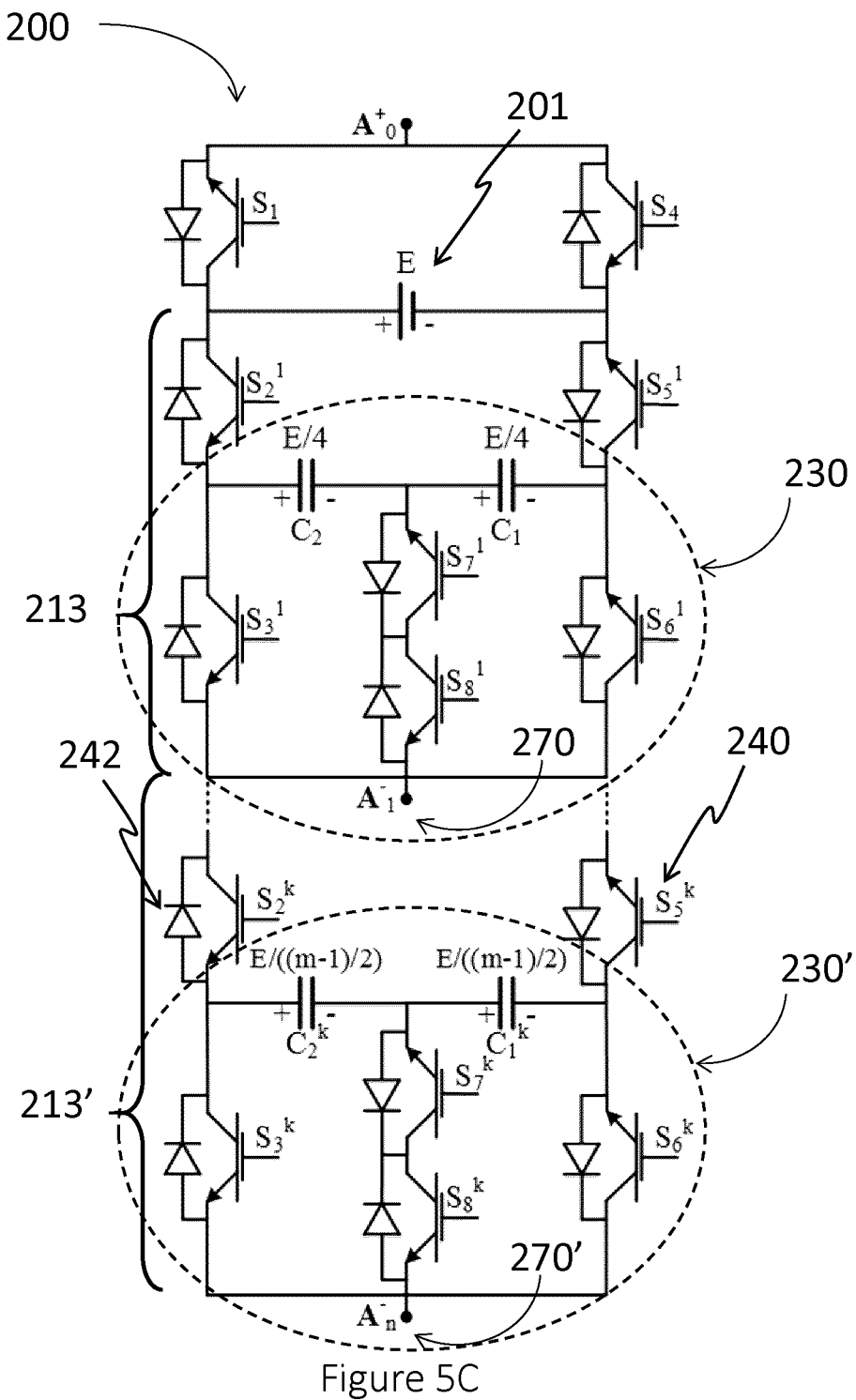
FIG. 5C presents a vertically-extended MVSI topology having multiple switching cells, according to at least one embodiment.

With reference to FIG. 5C, in some embodiments the PEC inverter 200 is vertically extendable; that is to say, can be extended by adding additional switching cells 213 and/or additional E-Cells 230 in parallel with one another. As can be noticed in this configuration of the PEC inverter 200, the additional E-Cell 230' is connected to the switching cell 213 by two additional switches 240 and 242 to form the switching cell 213', thereby producing a vertically-extended topology for the PEC inverter 200. Depending on the number of vertically-connected switching cells 213, a corresponding number of voltage levels are produced at the output terminal for the AC load 210. For instance, the corresponding voltage levels produced by vertically connecting 1, 2, 3, 4, and 5 switching cells is 9, 17, 33, 65, and 129 voltage levels, respectively.

In some embodiments, connecting multiple switching cells 213, 213' in parallel can provide several AC output terminal 270, 270' for connection to the AC load 210. The different AC output terminals 270, 270' can produce different voltage levels. Moreover, since each of the switching cells 213, 213' includes an associated pair of capacitors positioned in series, additional sensors can be provided to measure the voltage across each of the capacitor branches of each of the switching cells 213, 213'.

In addition, each of the capacitor branches for each of the switching cells 213, 213' causes concurrent charging and discharging for the capacitors located therein. The concurrent charging and discharging of both capacitors in each of the capacitor branches allows for voltage balancing of the capacitor branches. The voltage level for the balancing of the capacitor branches of the additional switching cell 213' is a ratio of the input DC voltage from the DC source 201 (½, ¼, ⅛, 1/16, . . . ). For example, the balancing voltage for a first additional switching cell is half of the input DC voltage from the DC source 201, the balancing voltage for a second additional switching cell is one quarter of the input DC voltage from the DC source 201, and so on. By choosing the appropriate switching state, the capacitor voltages are equally balanced to half of the corresponding balancing voltage for each switching cell 213 and 213'. Moreover, the additional switches 240, 242 for each additional switching cell 213' provides additional paths to the capacitors of the additional switching cell 213', which can be used to increase the number of switching state possibilities as well as increased voltage balancing redundancy.

Figure 5D:
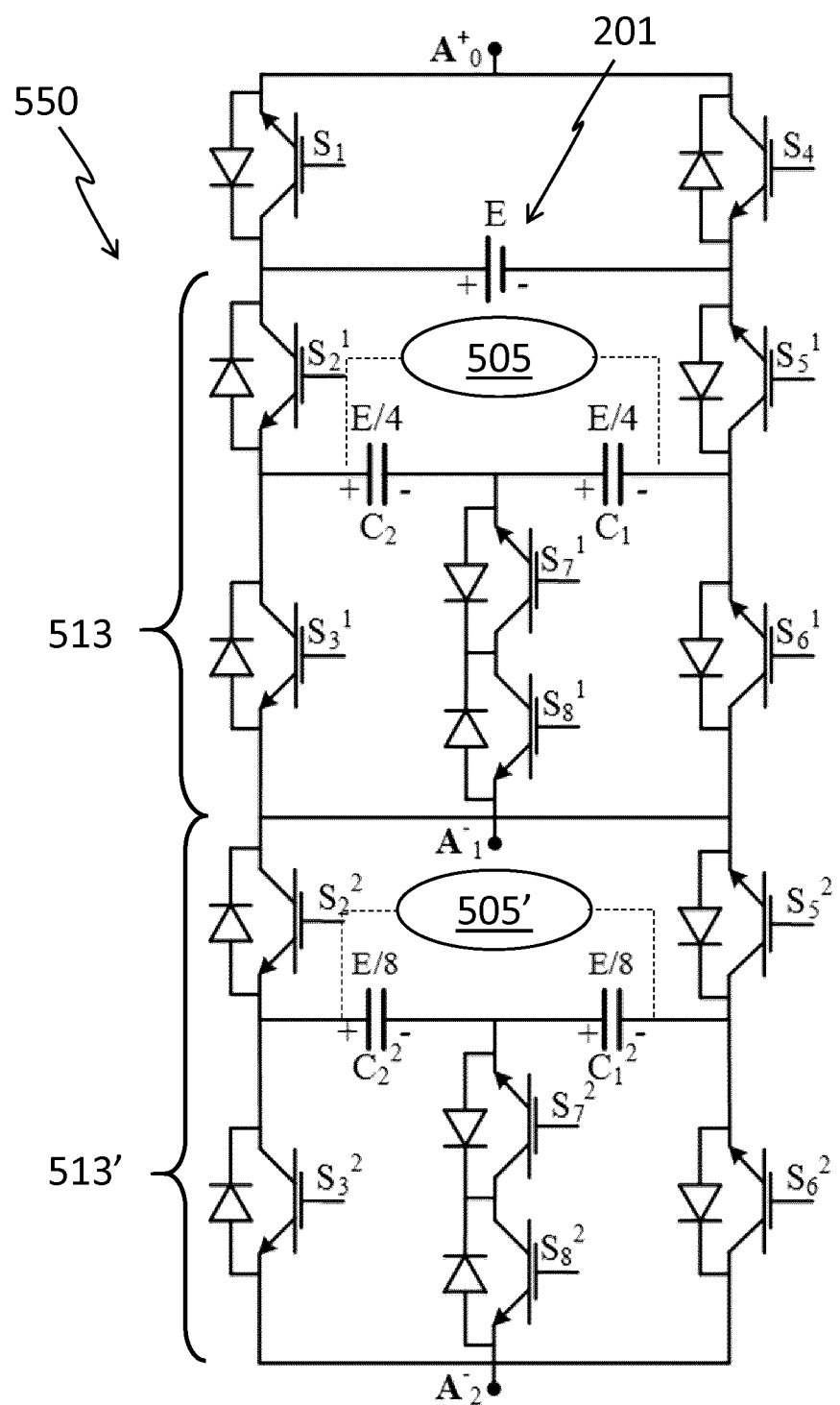
FIG. 5D presents a vertically-extended MVSI topology having two switching cells, according to at least one embodiment.

For instance, and with reference to FIG. 5D, there is illustrated a seventeen-voltage level PEC inverter 550 that includes two switching cells 513, 513', in which switching cell 513' is vertically-extended vis-à-vis switching cell 513. The PEC inverter 550 of FIG. 5D operates through seventy-two (72) switching states, which provides a greater number of switching states than a seventeen-level PUC inverter (which provides only 32 switching states), and provides additional voltage balancing functionality over the PUC inverter. Furthermore, the vertically-extended PEC inverter 550 has a lower number of capacitor branches in comparison with the PUC inverter, thereby decreasing the number of sensors required for operation. For example, a seventeen-level PEC inverter 550 has only two capacitor branches each capacitor branches being associated to a sensor (505 and 505'), a seventeen level PUC inverter requires three auxiliary DC-links (i.e. capacitor branches) which complicates designing the controller as more DC voltages should be involved.

With reference to FIG. 6, a table 600 providing a comparison among multilevel PEC inverter 200 and other conventional multilevel inverter topologies is illustrated, including CHB, DCI and FCI topologies. The table 600 compares counts of passive and active components. The comparative study for the number of components has been done based on a number of levels (m). As can be seen, the PEC inverter 200 has a smaller number of auxiliary capacitors and power switches compared to DCI and FCI; but, all these three inverters have single-DC sources. While PEC inverter 200 regulates the capacitor voltages through switching states, the capacitor voltages in FCI and DCI must be balanced using complex controllers when they are configured as more than three voltage level topologies. In comparison to CHB, the PEC inverter 200 advantageously has a single-DC source and smaller number of power switches. Moreover, the PEC inverter 200 only requires a single sensor across the capacitor branch in order to regulate the capacitor voltages. This further reduces number of total components used in the PEC 200 configuration. As well, the control technique used for the PEC inverter 200 may be simpler than that used in other topologies, since the capacitors are balanced using the redundancy of switching states.

With continued reference to FIG. 6, in table 602, since the PEC inverter 200 is compared to other nine-level inverter topologies. Although nine-level inverters considered in table 602 are classified into single-DC source configuration, the nine-level PEC inverter 200 has the smallest number of power switches and auxiliary capacitors when compared to other presented nine-level topologies.

Figure 1A:
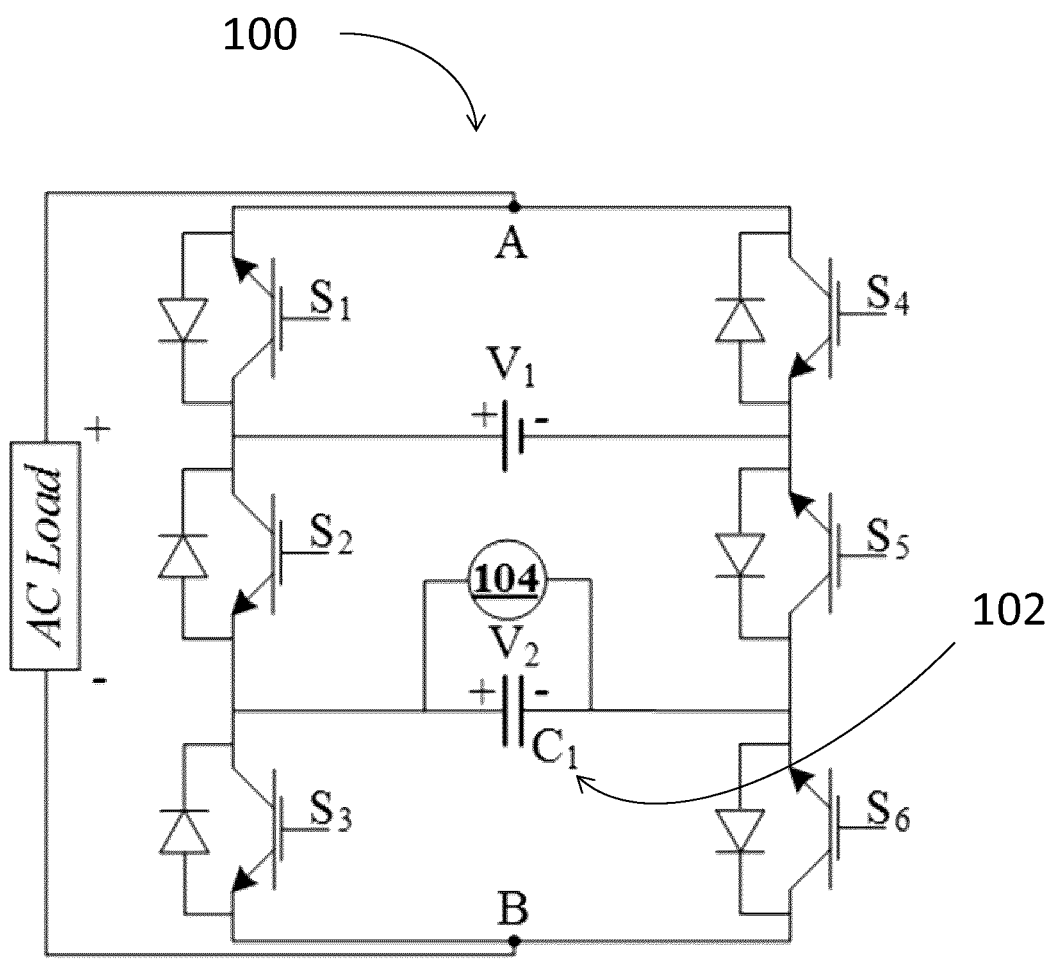
FIG. 1A presents a prior art Multilevel Voltage Source Inverter (MVSI) topology adapted to produce five voltage levels by using a single DC source and a single self-balancing capacitor.
Figure 1B:
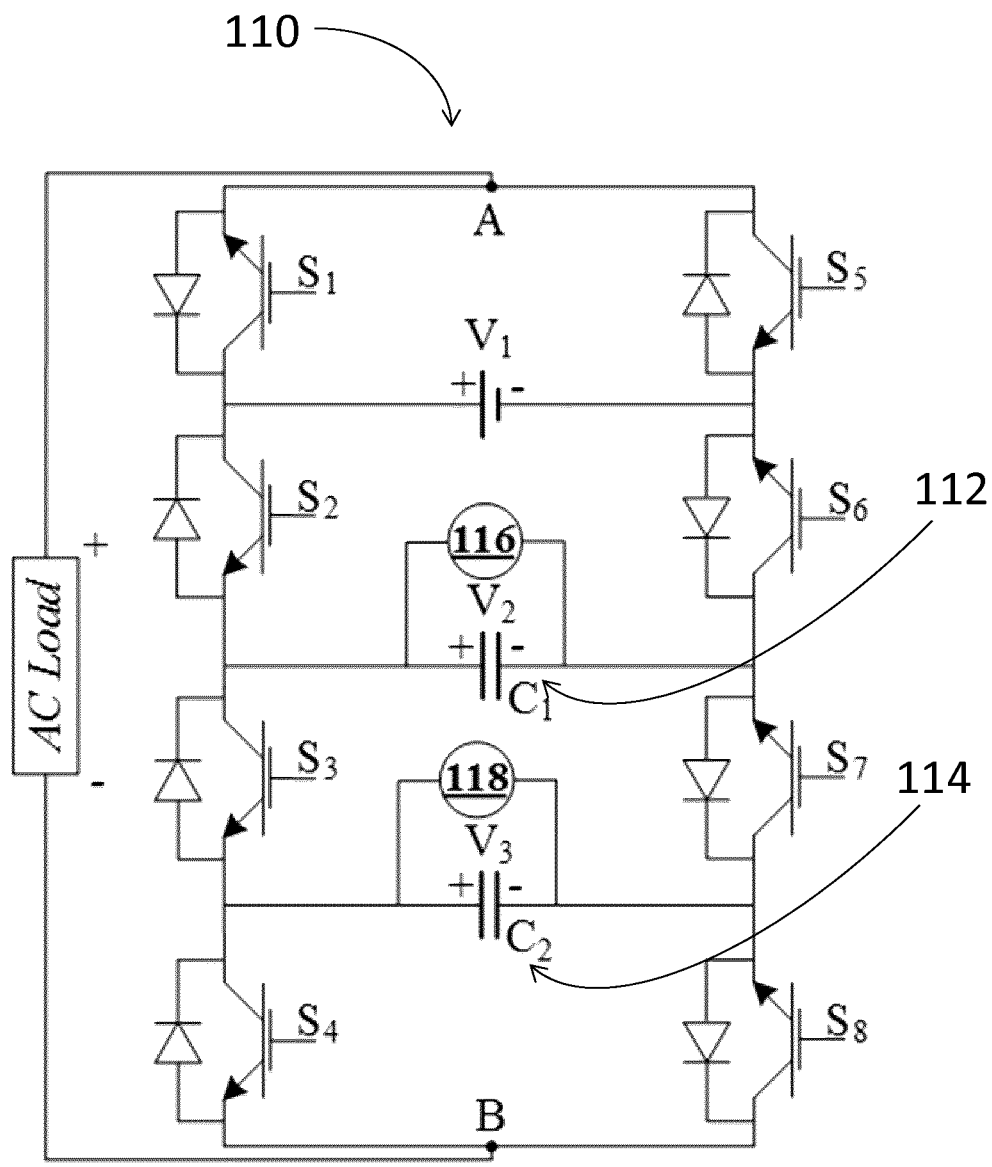
FIG. 1B presents a prior art MVSI topology adapted to produce nine voltage levels by using two auxiliary capacitors and associated sensors.

In addition, a comparison between the nine-level PEC inverter 200 and a nine-level configuration of the PUC inverter 10, as presented in FIG. 1B it can be noticed that the PUC inverter 110 requires a complex controller to balance the capacitors voltages to the desired levels. Since each capacitor in the PUC inverter 110 must be set to different voltage levels, each capacitor must be separately measured and this makes the adjustment of the designed controller challenging. In contrast, the PEC inverter 200 requires one sensor 205 to measure the capacitor branch voltage, and regulation of capacitor voltages is performed by using the redundancy of switching states.

Figure 7A:
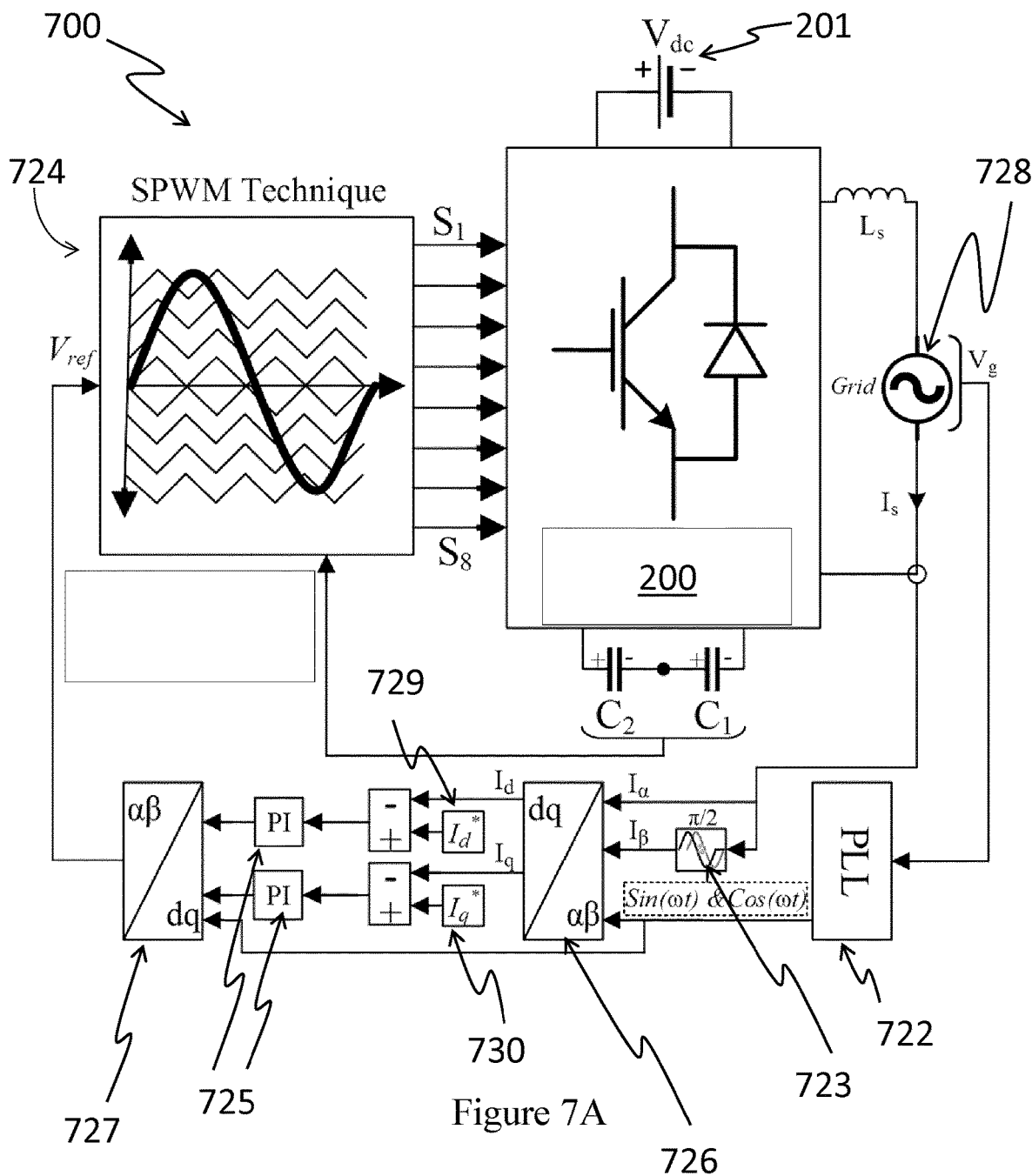
FIG. 7A presents a grid-connected controller for the MVSI topology of FIG. 2, according to at least one embodiment.

Presented in FIG. 7A is the PEC inverter 200 that is connected to a controller 700 using a DQ transformation theory adapted to attenuate the complexity of grid-tied inverter control through turning AC variables to DC components. To this end, the stationary reference frame (obtained from inverter current) is transformed into the synchronous rotating frame using Eq. (1) by transformation module 726.

$$\begin{bmatrix} I_d \\ I_q \end{bmatrix} = \begin{bmatrix} \cos(\omega t) & \sin(\omega t) \\ -\sin(\omega t) & \cos(\omega t) \end{bmatrix} \begin{bmatrix} I_\alpha \\ I_\beta \end{bmatrix} \quad (1)$$

$$\begin{bmatrix} I_\alpha \\ I_\beta \end{bmatrix} = \begin{bmatrix} \cos(\omega t) & -\sin(\omega t) \\ \sin(\omega t) & \cos(\omega t) \end{bmatrix} \begin{bmatrix} I_d \\ I_q \end{bmatrix} \quad (2)$$

The inverter current is transformed from single-phase into two-phase as orthogonal system by delaying $\pi/2$ phase shift module 723 to obtain stationary $\alpha\beta$ frame ($I\alpha$ & $I\beta$). By compensating DQ components (Id & Iq) through PI controller 725, they are converted into stationary reference frame according to Eq. (2) using conversion module 727 to generate the desired sinewave reference for the designed SPWM switching module 724. In addition, a PLL module 722 is used to generate a sine and cosine function according to a grid voltage measured by grid voltage measurement module 728 in order to form Eq. (1) and Eq. (2).

With continued reference to FIG. 7A, the controller schematic 700 of grid-tied operation of the nine-level PEC inverter 200 using DQ frame transformation is illustrated. In some embodiments, an inverter-injected current is synchronized to the grid voltage measurement provided by the grid voltage measurement module 728 through active and reactive power compensation provided by the PI controller 725. In this case, the current control gains are adjusted in such a way that the current produced by the PEC inverter 200 and the grid voltages have a common shape and phase degree, so that only active power will be delivered to the grid from the inverter side. Since, the capacitors are actively balanced through the redundancy of switching states; the capacitors are not controlled by the grid-tied controller 700, which can simplify the grid-tied control technique. The role of the grid-tied controller 700 is to synchronize the inverter current and the grid voltage. In some other cases, the grid-tied controller 700 can also be adjusted in such way that the inverter current is in 90 degree phase shift by the grid voltage which can be used for STATCOM application. However, in at least some cases, the capacitor branch voltage is measured and compared to half of the value of the input DC voltage from the DC input 201 to choose the proper switching state for voltage balancing of the capacitors. A modulation technique for controlling the switching state is described in greater detail hereinbelow, in relation to FIG. 7B.

As it is depicted in the controller of FIG. 7A, the sine and cosine references are extracted from grid voltage using PLL block 722 to be used in matrix of Eq. (1) and Eq. (2). The DQ components are achieved with respect to the stationary frame of inverter current and Eq. (1). Afterwards, they are compared with their references provided by Id* and Iq* reference generation modules (729 and 730) to produce the error signals to be regulated by appropriate selection of proportional and integral gains. The Iq* reference generation module 730 is adjusted to have unity power factor between current and voltage waveforms and Id* reference generation module 729 is used to deliver desired pure active power. It must be noticed that any other power factor mode of operation can be tracked by choosing other values for Iq* reference generation module 730. In this case, Iq* reference generation module 730 can be adjusted that inverter current is in 90 degree phase shift by grid voltage which can be used for STATCOM application. The compensated error signals that are in the synchronous rotating frame would be transferred into the stationary reference frame using Eq. (2) to acquire suitable $V_{ref}$ required for pulses generation in the SPWM switching module 724.

Figure 7B:
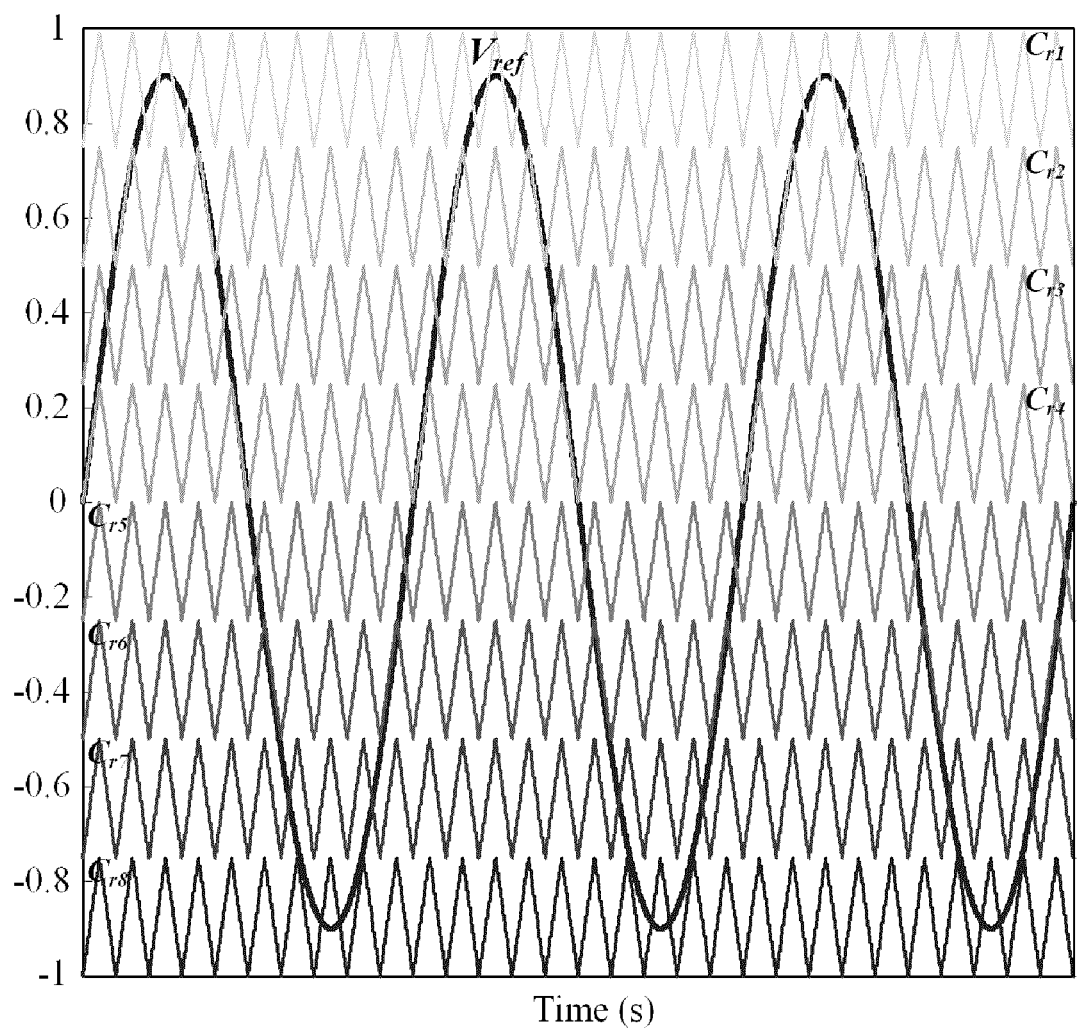
FIG. 7B presents a graph depicting a nine level Sinusoidal Pulse Width Modulation (SPWM) technique for control of the MVSI topology of FIG. 2, according to at least one embodiment.
Figure 7C:
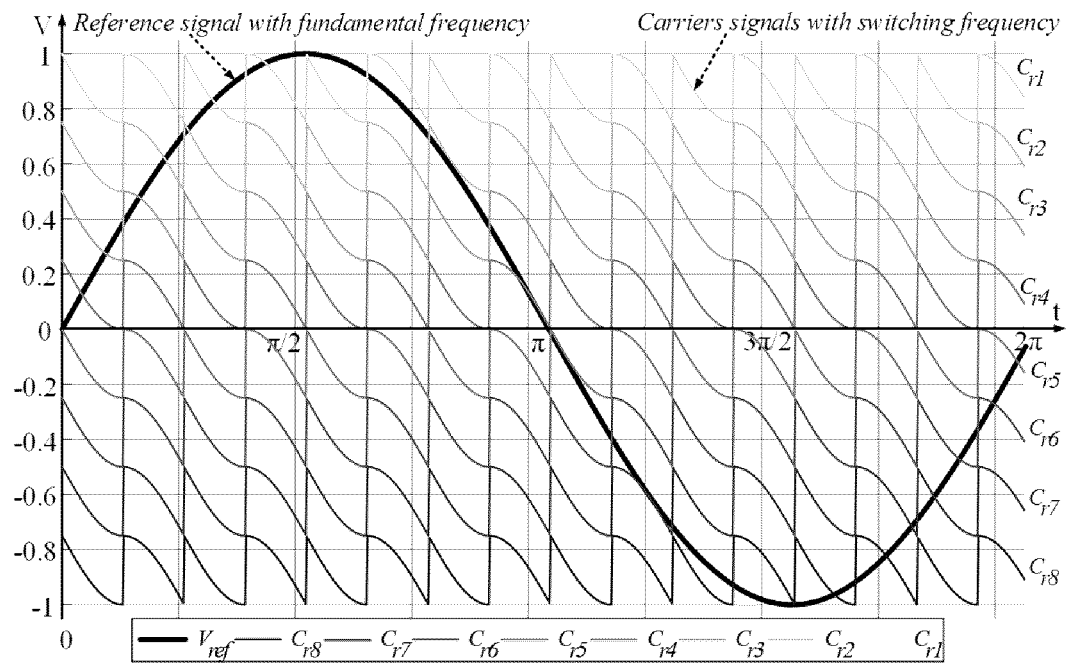
FIG. 7C presents an alternate graph depicting a nine level Sinusoidal Pulse Width Modulation (SPWM) technique for control of the MVSI topology of FIG. 2, according to at least one embodiment.

With additional reference to FIG. 7B, It should be noted that other controller designs adapted to generate a suitable $V_{ref}$ for pulse generation in the SPWM switching module 724, as presented in the graph of FIG. 7B can be used for standalone and/or grid-tied operation of the PEC inverter 200. Although triangle waveforms have been used as carrier signals in FIG. 7B, any other suitable type of carrier waveforms can also, or alternatively, be used in the SPWM switching module 724. For example, and with additional reference to FIG. 7C, another carrier waveform based on parabolic function could be used in the SPWM switching module 724.

Figure 7D:
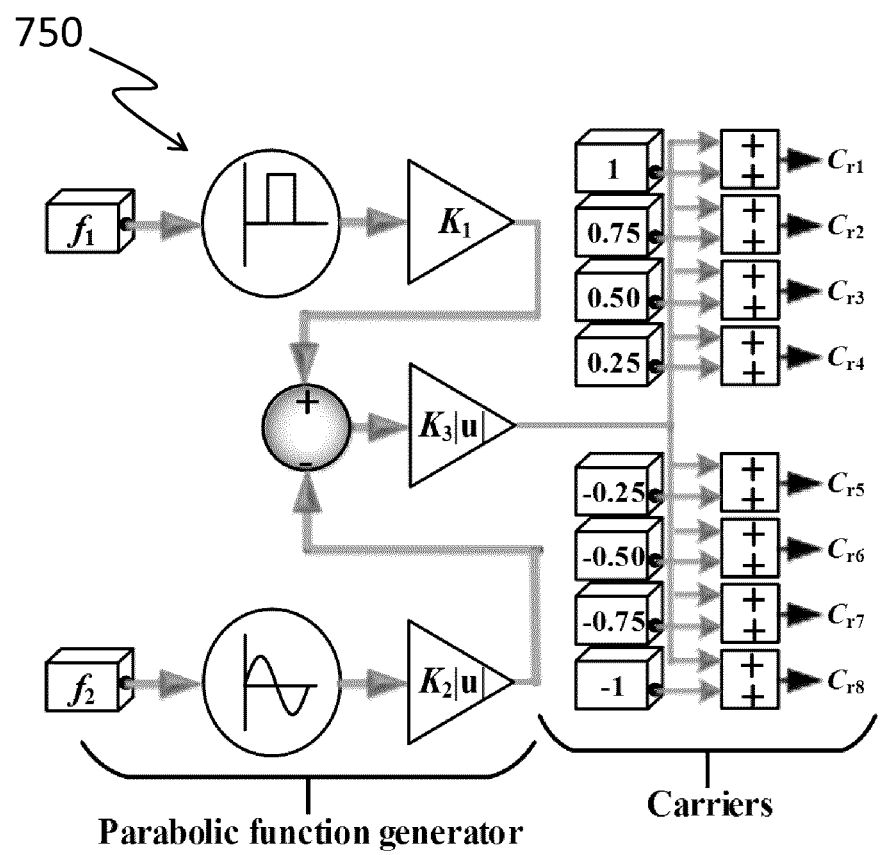
FIG. 7D presents a process for generating parabolic carrier signals used by the SPWM technique presented in FIG. 7C, according to at least one embodiment.

With reference to FIG. 7D, there is shown a process 750 for generating parabolic carrier signals defined by using sinusoidal and pulse functions. Considering the frequency of pulse function $f_1$ that is two times greater than the sinusoidal function $f_2$ ($f_1=2f_2$) the half-parabola waveform is attained. Based on the frequency ratio between $f_1$ and $f_2$, various types of parabolic functions can be generated. The factors $K_1$, $K_2$ and $K_3$ are also selected as 0.5, 1 and 0.25, respectively.

Figure 8:
FIG. 8 presents a table showing various parameter values used during a simulation test with the MVSI topology of FIG. 2, according to at least one embodiment.

With reference to FIG. 8, in order to assess the functionality and performance of the PEC inverter 200, a virtual model of the PEC inverter 200 was simulated. The simulations evaluated the operation of the PEC inverter in both grid-tied and standalone mode of operations. The simulation system parameters of nine-level PEC inverter 200 in both modes of operation are listed in table 800.

In standalone mode of operation of single/three-phase nine-level PEC inverter 200, simulations with both linear and nonlinear loads were performed, as well as changing of single-DC source voltage and amplitude modulation index. The simulations serve to evaluate the self-regulation function of the capacitors 202, 204 in different operating contexts for the PEC inverter 200.

Figure 9A:
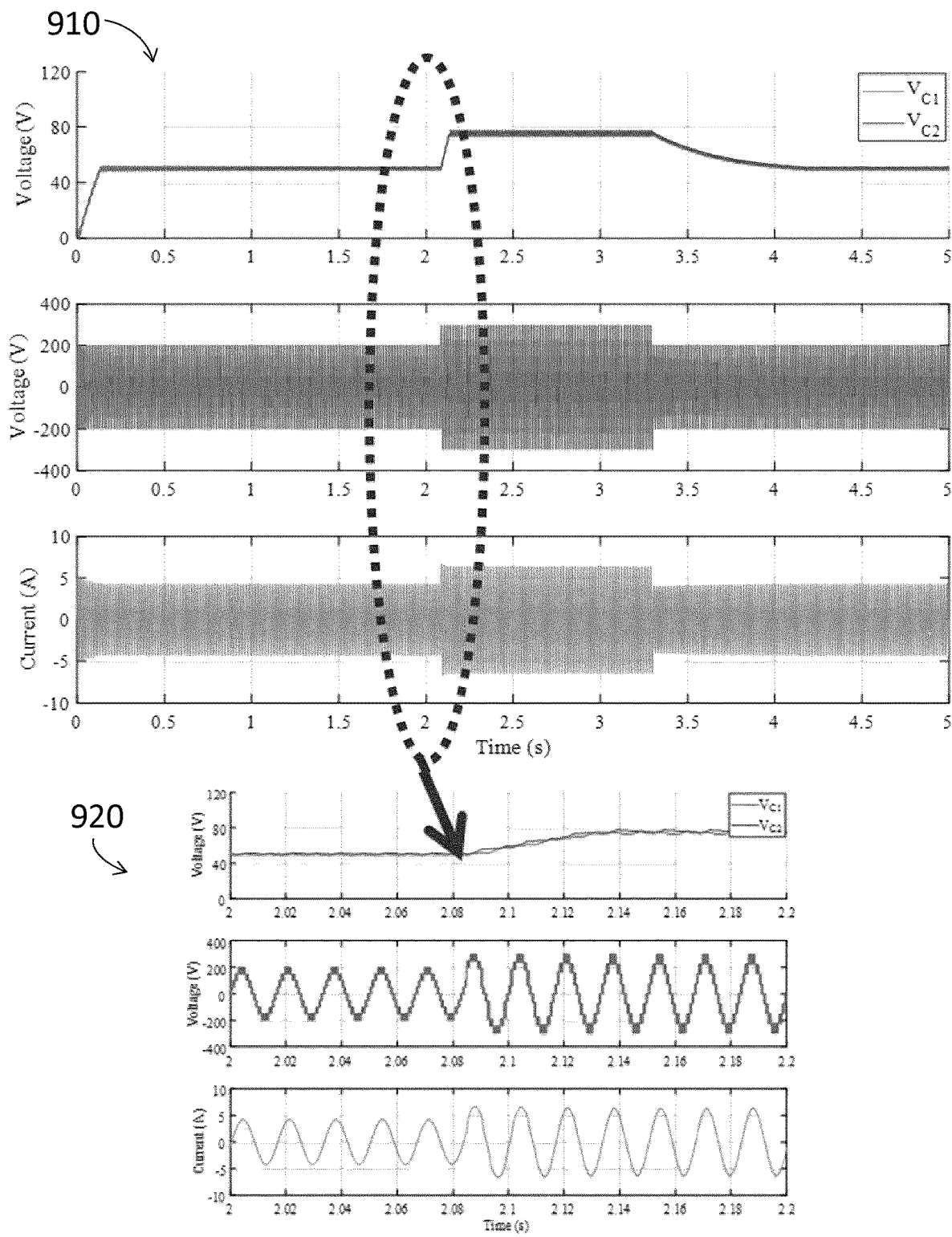
FIGS. 9A to 9C present various voltage waveforms of capacitors of the MVSI topology of FIG. 2 under various operation conditions such as DC source changes, modulation index variations, and steady-state operation, according to at least one embodiment.
Figure 9B:
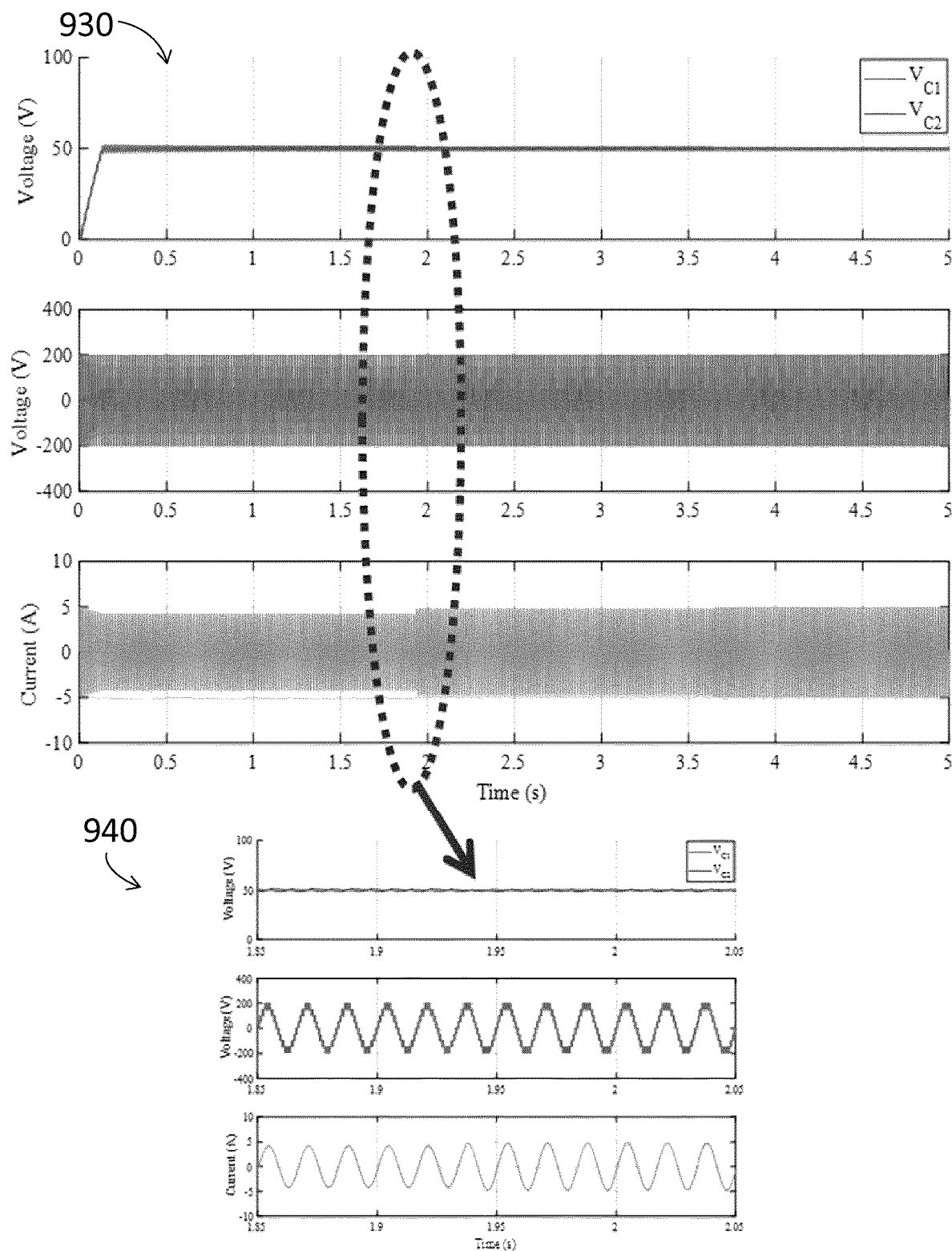

With reference to FIG. 9A, simulation results 910 are shown of nine-level voltage, load currents and capacitors voltages of single-phase PEC inverter when the DC voltage or modulation index has changed. In addition, simulation results 920 are a close up of the portion of the simulation when the DC voltage varies from 200V to 300V and from 300V to 200V while the modulation index is 0.85 are shown. With reference to FIG. 9B, simulation results 930 illustrates the results when the modulation index changes from 0.85 to 0.95 and from 0.95 to 1.05 while the DC source is maintained at 200V. Simulation results 940 are a close up of the portion of the simulation results 930 when the modulation index changes and DC source voltage is constant at 200V. Based on the simulation results 910-940 of FIGS. 9A and 9B, the capacitor voltages are kept balanced during changes in DC voltage or modulation index.

Figure 9C:
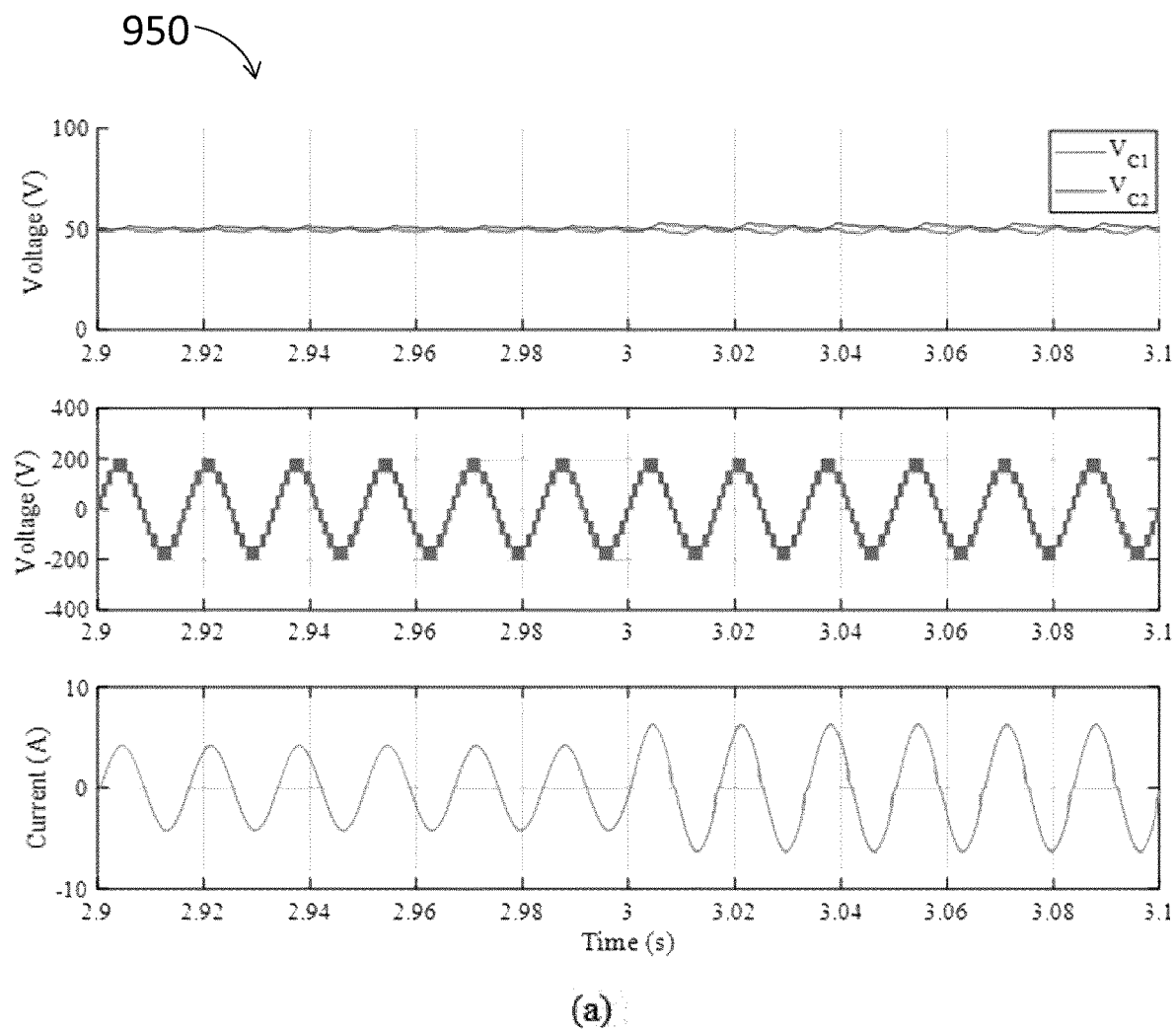
Figure 10:
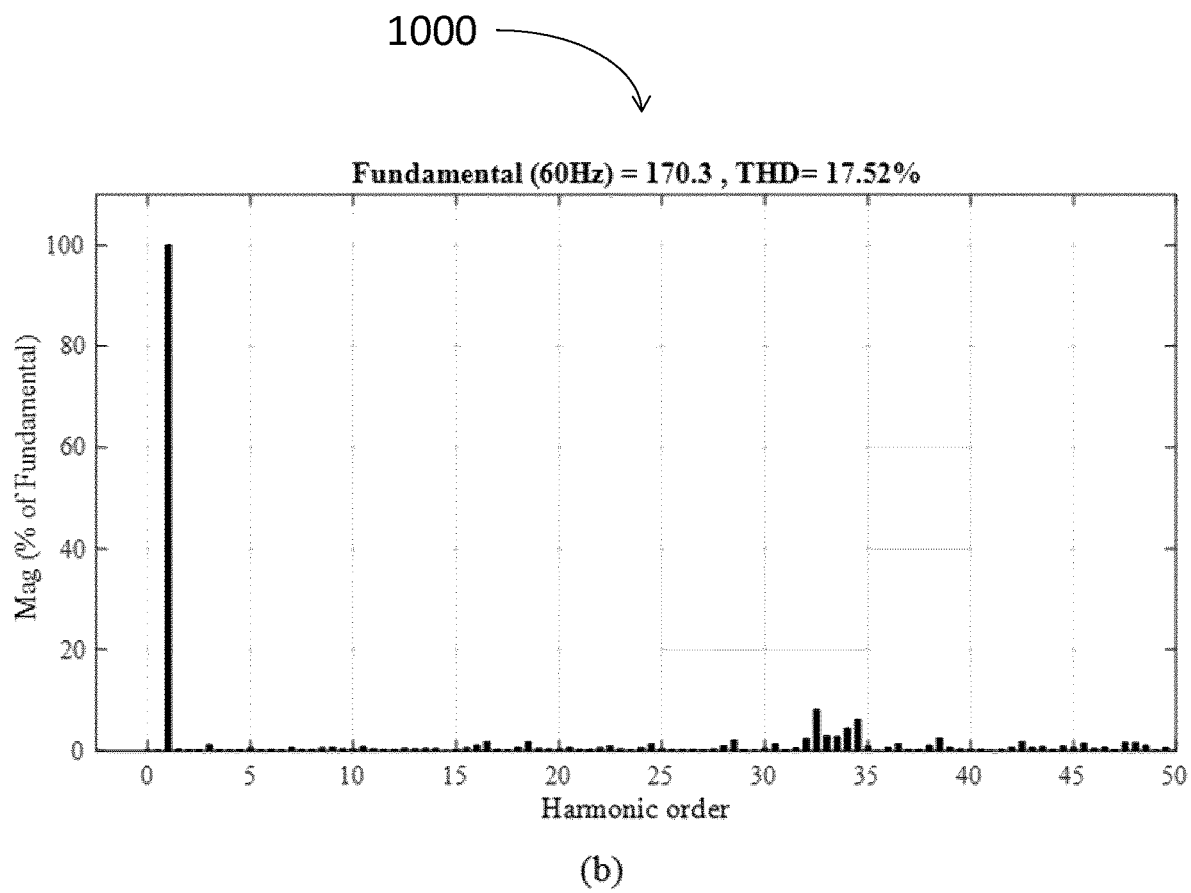
FIG. 10 presents voltage harmonic spectrum simulation results of the MVSI topology of FIG. 2, according to at least one embodiment.

With reference to FIG. 9C, simulation results 950 showing voltage, load current and capacitors voltages waveforms are illustrated. With reference to FIG. 10, simulation results 1000 are illustrated, which are indicative of a voltage harmonic spectrum when the single-phase PEC inverter 200 supplies normal load and single-phase diode rectifier as a harmonic load is suddenly connected in parallel. The diode rectifier has R-L load in its DC side with the same value as shown in table 800 of FIG. 8. According to the simulation results 950, even after the connection of the nonlinear load, the capacitors voltages remain balanced.

Figure 11:
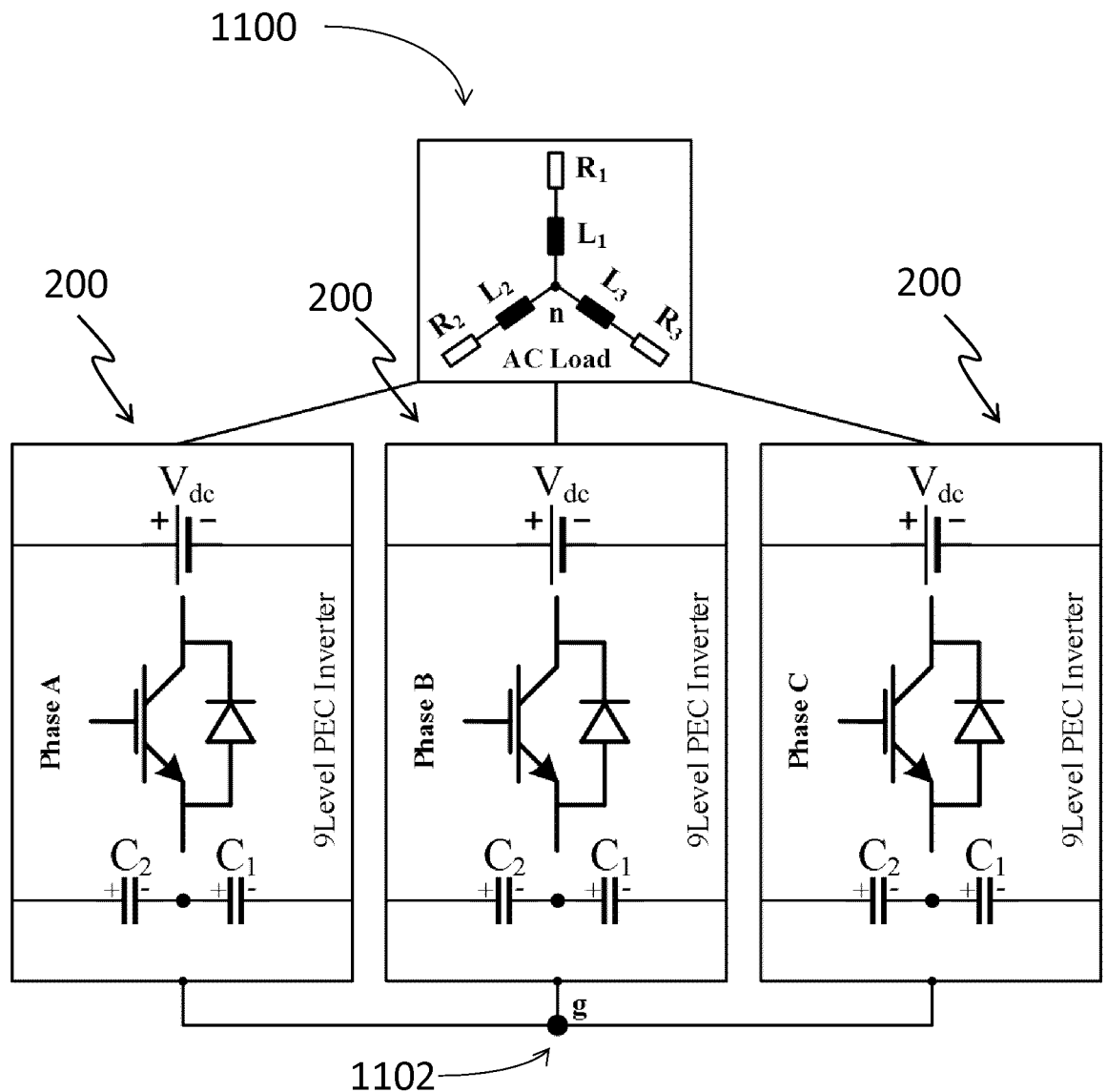
FIG. 11 presents a three phase configuration for the MVSI topology of FIG. 2, according to at least one embodiment.

With reference to FIG. 11, the PEC inverter 200 can be employed as a three-phase structure 1100. The three-phase structure 1100 has three single-phase topologies of the PEC inverter 200. The end portions of each single-phase PEC inverter 200 are connected to each other in order to make a neutral point 1102 for the three-phase topology 1100. The nine-level voltages are measured between the output terminal of each single-phase PEC inverter 200 and the neutral point of three-phase topology 1100.

Figure 12:
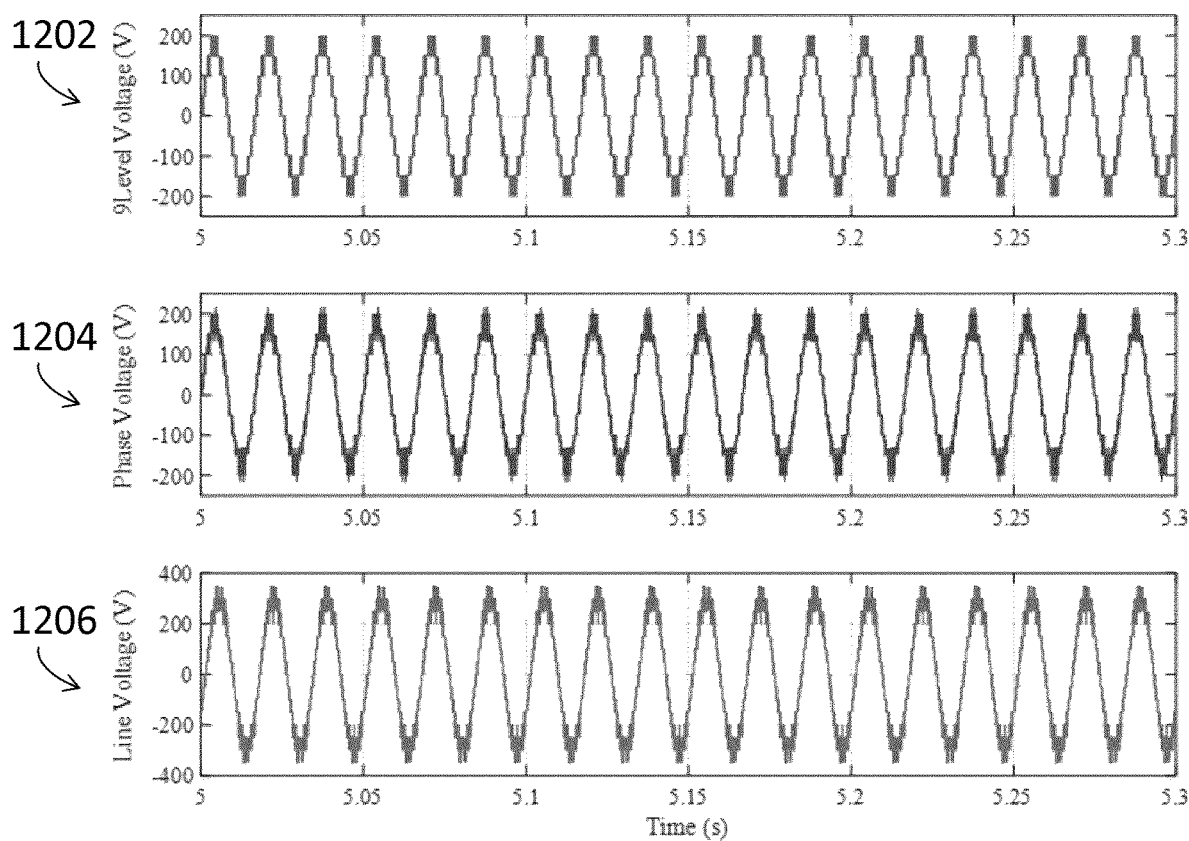
FIG. 12 presents a nine-level, phase and line voltages waveforms of the three phase configuration of FIG. 11, according to at least one embodiment.

With reference to FIG. 12, simulation results for the nine-level voltage 1202, phase 1204, and line voltage 1206 waveforms when the inverter is connected to linear R-L loads with the same values as identified in table 800 and the modulation index is 0.85 are illustrated. The simulation results 1202-1206 of FIG. 12, are indicative of operation of the three-phase nine-level PEC inverter 200 when both linear and nonlinear loads are supplied, and when the modulation index is 0.85. In some embodiments, the capacitor voltages are self-regulated to the balancing voltage which is a quarter of the DC voltage magnitude in the three-phase configuration 1100 of nine-level PEC inverter 200.

In the case of grid-tied mode of operation, the single-phase nine-level PEC inverter 200 is connected to a single-phase AC grid. Simulation results for the grid-tied mode, obtained under unity power factor and for active power injection to the grid, were obtained. To evaluate the performance of the nine-level PEC inverter 200 and capacitor voltage balancing in grid-tied mode of operation, the current reference was changed during the simulation. According to the obtained results, the grid voltage and inverter current remained phase as a result of appropriate tuning of the designed grid-tied controller. In addition, the capacitors of the PEC inverters 200 were completely balanced to a quarter of input DC voltage, including following changes to the current reference.

Figure 13:
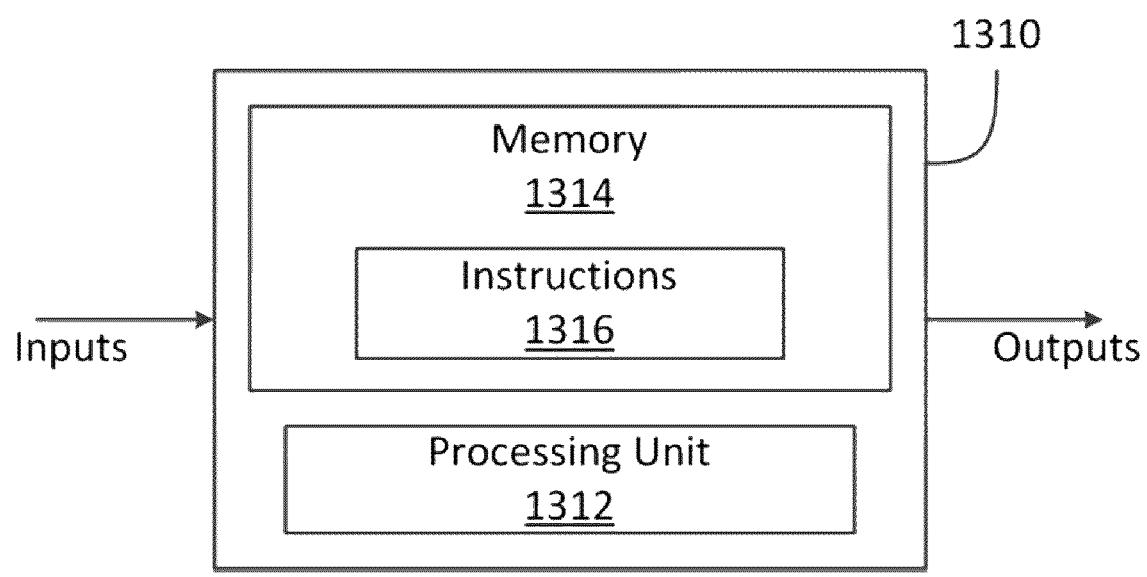
FIG. 13 is a block diagram of a computing system for implementing a controller for the MVSI topology of FIG. 2, according to at least one embodiment.

With reference to FIG. 13, the controller which controls operation of the PEC inverter 200, including the operation of the switches 212-222 of the half-bridge inverter 211 and the switching cell 213 may be implemented using any suitable computing device 1310 comprising a processing unit 1312 and a memory 1314 which has stored therein computer-executable instructions 1316. The processing unit 1312 may comprise any suitable devices configured to implement the system such that instructions 1316, when executed by the computing device 1310 or other programmable apparatus may cause the functions/acts/steps ascribed to the controller as described herein to be executed. The processing unit 1312 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 1314 may comprise any suitable known or other machine-readable storage medium. The memory 1314 may comprise non-transitory computer readable storage medium, for example, but not limited to, an electronic, magnetic, optical, electromagnetic, infrared, or semiconductor system, apparatus, or device, or any suitable combination of the foregoing. The memory 1314 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 1314 may comprise any storage means (e.g., devices) suitable for retrievably storing machine-readable instructions 1316 executable by processing unit 1312.

Figure 14:
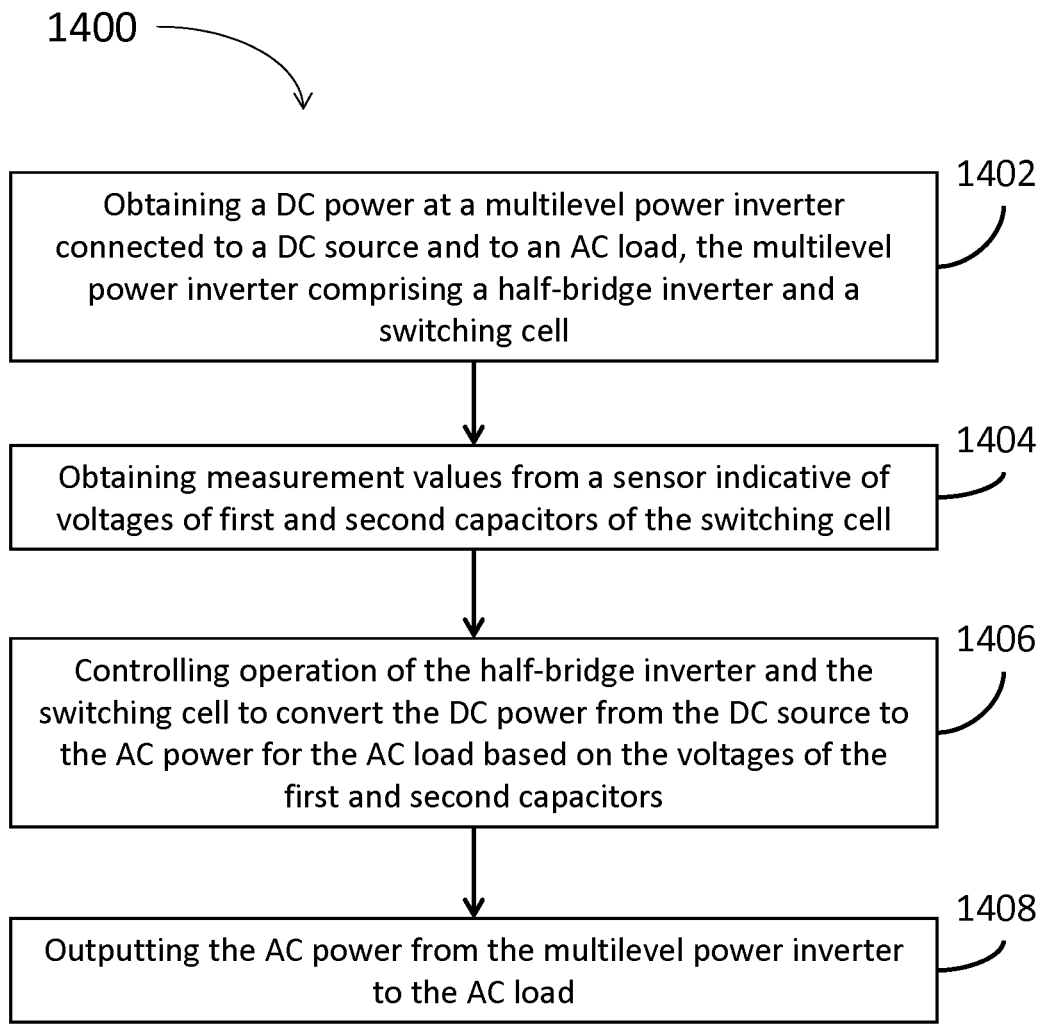
FIG. 14 is a flowchart illustrating a method for transforming direct current (DC) power from a DC source to alternating current (AC) power for an AC load, according to at least one embodiment.

With reference to FIG. 14, there is shown a method 1400 for transforming direct current (DC) power from a DC source to alternating current (AC) power for an AC load, for instance DC power from the DC source 210 which is provided as AC power for the AC load 210. In some embodiments, the method 1400 can be performed at least in part by a controller of a power inverter.

At step 1402, the DC power is obtained at a multilevel power inverter, for instance the PEC inverter 200, which is connected to the DC source 201 and to the AC load 210. The PEC inverter 200 is composed of a half-bridge inverter, for instance the half-bridge inverter 211, and a switching cell, for instance the switching cell 213. The half-bridge inverter 211 is connected to first and second ports of the DC source 201 and to a first port of the AC load 210. The switching cell 213 is connected to the first and second ports of the DC source 201 in parallel with the half-bridge inverter 211, and to a second port of the AC load 210. The switching cell 213 comprises at least first and second capacitors connected in series, for instance the capacitors 202, 204.

At step 1404, measurement values from a sensor are obtained. The measurement values are indicative of voltages of the first and second capacitors 202, 204. The sensor can be positioned at any suitable location, and can measure the voltages of the first and second capacitors 202, 204 in any suitable fashion. For example, the sensor can provide the measurement values to a controller of the PEC inverter 200. In some embodiments, the measurement values are indicative of voltages of additional capacitors beyond the first and second capacitors 202, 204.

At step 1406, operation of the half-bridge inverter 211 and of the switching cell 213 is controlled to convert the DC power from the DC source 201 to the AC power for the AC load 210. The operation of the half-bridge inverter 211 and of the switching cell 213 can be controlled on the basis of at least the voltages of the first and second capacitors. For example, the controller of the PEC inverter 200 can control the operation of the half-bridge inverter 211 and of the switching cell 213. In some embodiments, control of the operation of the switching cell 213 comprises regulating the voltages of the first and second capacitors 202, 204, for instance to actively balance the voltages of the capacitors 202, 204 to equal values.

At step 1408, the AC power is output from the PEC inverter 200 to the AC load 210. The output of the AC power can be controlled by the controller of the PEC inverter 200. In some embodiments, the output of the AC power can be started, stopped, interrupted, and/or varied by the controller of the PEC inverter 200. Other embodiments are also considered. It should be noted that although the description of the method 1400 focuses on the use of the PEC inverter 200 as the multilevel power inverter, the use of other types of multilevel power inverters is also considered.

It should be noted that, in some embodiments, similar steps as those of the method 1400 can be performed to permit the PEC 200 to act as a current rectifier. For instance, AC power may be received by the PEC 200 and transformed to DC power by controlling the half-bridge inverter 211 and the switching cell 213.

The methods and systems described herein may be implemented in a high level procedural or object oriented programming or scripting language, or a combination thereof, to communicate with or assist in the operation of a computer system, for example the computing device 1310. Alternatively, the methods and systems may be implemented in assembly or machine language. The language may be a compiled or interpreted language. Program code for implementing the methods and systems for detection may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or in some embodiments the processing unit 1312 of the computing device 1310, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure. For instance, it shall be recognized that the PEC inverter 200 of FIG. 2 can be modified to function as a rectifier by changing the direction of the switches 216 and 222. In some cases, the rectifier can be used in a battery charger application. Other uses for the PEC inverter are also considered.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A multilevel power converter for transforming direct current (DC) power from a DC source to alternating current (AC) power for an AC load or for transforming AC power from an AC source to DC power for a DC load, comprising:
   a half-bridge inverter connectable to first and second ports of the DC source and to a first port of the AC load;
   a switching cell connected to the half-bridge inverter and connectable to the DC source, in parallel with the half-bridge inverter, and to a second port of the AC load, the switching cell comprising:
      a first pair of switches forming a first branch connectable between the first port of the DC source and the second port of the AC load;
      a second pair of switches forming a second branch connectable between the second port of the DC source and the second port of the AC load, in parallel with the first branch;
      first and second capacitors connected in series in a capacitor branch, the capacitor branch connected between the first and second branches at first and second points located between the switches of the first and second pairs of switches, respectively; and
      a pair of back-to-back connected switches in a third branch, the third branch connected to the capacitor branch at a third point located between the first and second capacitors and connectable to the second port of the AC load; and a controller coupled to the half-bridge inverter and to the switching cell and configured for controlling operation of the half-bridge inverter and the switching cell to convert the DC power from the DC source to the AC power for the AC load.

2. The multilevel power converter of claim 1, wherein the switching cell further comprises:
  at least one additional capacitor connected in the capacitor branch; and
  at least one additional branch connected to the capacitor branch at a respective additional point located between the at least one additional capacitor and an adjacent capacitor and connectable to the second port of the AC load, the at least one additional branches comprising at least one additional pair of back-to-back connected switches.

3. The multilevel power converter of claim 2, wherein the controller is configured to convert the DC power to the AC power by producing m voltage levels, where m=number of capacitors×4+1, wherein the number of capacitors includes the first and second capacitors and the at least one additional capacitor.

4. The multilevel power converter of claim 1, wherein the switching cell is a first switching cell, further comprising at least one additional switching cell connected in parallel to the half-bridge inverter and to the first switching cell, the at least one additional switching cell being connectable to a second port of the AC load.

5. The multilevel power converter of claim 4, further comprising at least one voltage sensor coupled to the at least one additional switching cell for measuring voltages of capacitors of the at least one additional switching cell.

6. The multilevel power converter of claim 4, wherein the controller is configured to convert the DC power to the AC power by producing at least seventeen voltage levels.

7. The multilevel power converter of claim 1, wherein controlling operation of the switching cell comprises regulating voltages of the first and second capacitors.

8. The multilevel power converter of claim 7, wherein regulating the voltages of the first and second capacitors comprises actively balancing the voltages of the first and second capacitors.

9. The multilevel power converter of claim 8, wherein actively balancing the voltages of the first and second capacitors comprises balancing the voltages of the first and second capacitors to equal values.

10. The multilevel power converter of claim 9, wherein the equal values are of one-quarter of a voltage amplitude of the DC source.

11. The multilevel power converter of claim 7, further comprising a voltage sensor coupled to the switching cell for measuring voltages of the first and second capacitors.

12. The multilevel power converter of claim 1, wherein the controller is configured to convert the DC power to the AC power by producing at least nine voltage levels.

13. The multilevel power converter of claim 1, further comprising an external controller for adjusting the voltage of each capacitors to ⅕ of the DC power in order to produce at least eleven voltage levels.

14. The multilevel power converter of claim 1, wherein a switching frequency of switches composing the half-bridge inverter is lower than a switching frequency of the first and second pairs of switches of the switching cell.

15. The multilevel power converter of claim 1, wherein a rated voltage value of the first and second pairs of switches of the switching cell is lower than a rated voltage value of switches composing the half-bridge inverter.

16. A method for transforming direct current (DC) power from a DC source to alternating current (AC) power for an AC load, comprising:
  obtaining the DC power at a multilevel power converter connected to the DC source and to the AC load, the multilevel power converter comprising a half-bridge inverter, connected to first and second ports of the DC source and to a first port of the AC load, and a switching cell, connected to the first and second ports of the DC source in parallel with the half-bridge inverter and to a second port of the AC load, wherein the switching cell comprises first and second capacitors connected in series and split by a pair of back-to-back connected switches;
  obtaining measurement values from a sensor indicative of voltages of the first and second capacitors;
  controlling operation of the half-bridge inverter and the switching cell to convert the DC power from the DC source to the AC power for the AC load based on the voltages of the first and second capacitors by activating at least one of the back-to-back connected switches; and
  outputting the AC power from the multilevel power converter to the AC load via the first and second ports of the AC load.

17. The method of claim 16, wherein obtaining measurement values from the sensor comprises obtaining measurement values indicative of voltages of the first and second capacitors, and of at least one third capacitor of the switching cell, and wherein the operation of the switching cell is further controlled based on the voltage of the at least one third capacitor.

18. The method of claim 16, wherein the sensor is a first sensor, the method further comprising obtaining measurement values from a second sensor indicative of voltages of at least third and fourth capacitors of at least one additional switching cell connected in parallel to the half-bridge inverter and to the first switching cell.

19. The method of claim 16, wherein controlling operation of the switching cell comprises regulating voltages of the first and second capacitors.

20. The method of claim 19, wherein regulating the voltages of the first and second capacitors comprises actively balancing the voltages of the first and second capacitors to equal values.

* * * * *